(12) United States Patent
Aharoni et al.

(10) Patent No.: US 11,804,211 B2
(45) Date of Patent: Oct. 31, 2023

(54) EXAMPLE-BASED VOICE BOT DEVELOPMENT TECHNIQUES

(71) Applicant: Google LLC, Mountain View, CA (US)

(72) Inventors: Asaf Aharoni, Tel Aviv-Jaffa (IL); Yaniv Leviathan, New York, NY (US); Eyal Segalis, Tel Aviv-Jaffa (IL); Gal Elidan, Modiin (IL); Sasha Goldshtein, Tel Aviv-Jaffa (IL); Tomer Amiaz, Tel Aviv-Jaffa (IL); Deborah Cohen, Tel Aviv-Jaffa (IL)

(73) Assignee: GOOGLE LLC, Mountain View, CA (US)

( * ) Notice: Subject to any disclaimer, the term of this patent is extended or adjusted under 35 U.S.C. 154(b) by 166 days.

(21) Appl. No.: 17/112,418

(22) Filed: Dec. 4, 2020

(65) Prior Publication Data

US 2022/0180857 A1    Jun. 9, 2022

(51) Int. Cl.
*G06N 20/00* (2019.01)
*G10L 15/22* (2006.01)
(Continued)

(52) U.S. Cl.
CPC ............ *G10L 15/063* (2013.01); *G06N 20/00* (2019.01); *G10L 15/02* (2013.01); *G10L 15/04* (2013.01);
(Continued)

(58) Field of Classification Search
CPC ....... G10L 15/063; G10L 15/02; G10L 15/04; G10L 15/22; G10L 2015/0635; G06N 20/00; H04L 67/133; H04M 3/493
See application file for complete search history.

(56) References Cited

U.S. PATENT DOCUMENTS 10,691,897 B1 * 6/2020 Rajagopal ............. G06F 40/284
10,923,109 B2 * 2/2021 Chakraborty ........... H04L 51/02
(Continued)

FOREIGN PATENT DOCUMENTS

| CN | 108229686 | 6/2018 |
|---|---|---|
| GB | 2367402 | 4/2002 |

OTHER PUBLICATIONS

G. Daniel, J. Cabot et al., "Xatkit: A Multimodal Low-Code Chatbot Development Framework," in IEEE Access, vol. 8, pp. 15332-15346, 2020 (Year: 2020).*

(Continued)

*Primary Examiner* — Bhavesh M Mehta
*Assistant Examiner* — Nandini Subramani
(74) *Attorney, Agent, or Firm* — Gray Ice Higdon

(57) ABSTRACT

Implementations are directed to providing a voice bot development platform that enables a third-party developer to train a voice bot based on training instance(s). The training instance(s) can each include training input and training output. The training input can include a portion of a corresponding conversation and a prior context of the corresponding conversation. The training output can include a corresponding ground truth response to the portion of the corresponding conversation. Subsequent to training, the voice bot can be deployed for conducting conversations on behalf of a third-party. In some implementations, the voice bot is further trained based on a corresponding feature emphasis input that attentions the voice bot to a particular feature of the portion of the corresponding conversation. In some additional or alternative implementations, the voice bot is further trained to interact with third-party system(s) via remote procedure calls (RPCs).

20 Claims, 9 Drawing Sheets

(51) Int. Cl.
*H04M 3/493* (2006.01)
*G10L 15/06* (2013.01)
*H04L 67/133* (2022.01)
*G10L 15/02* (2006.01)
*G10L 15/04* (2013.01)

(52) U.S. Cl.
CPC ............ *G10L 15/22* (2013.01); *H04L 67/133* (2022.05); *H04M 3/493* (2013.01); *G10L 2015/0635* (2013.01)

(56) References Cited

U.S. PATENT DOCUMENTS

| | | | |
|---|---|---|---|
| 11,113,475 B2 * | 9/2021 | Sampat | G06F 40/35 |
| 11,373,131 B1 | 6/2022 | Venugopal | |
| 2015/0278706 A1 | 10/2015 | Shivashankar et al. | |
| 2017/0300831 A1 * | 10/2017 | Gelfenbeyn | G06F 9/54 |
| 2017/0330077 A1 * | 11/2017 | Williams | G06N 3/042 |
| 2019/0102078 A1 | 4/2019 | Bhatt et al. | |
| 2019/0206393 A1 | 7/2019 | Fang et al. | |
| 2019/0378015 A1 | 12/2019 | Lin et al. | |
| 2020/0090651 A1 * | 3/2020 | Tran | G06N 3/10 |
| 2020/0097544 A1 | 3/2020 | Alexander et al. | |
| 2020/0341970 A1 * | 10/2020 | Rodrigues | H04L 51/02 |
| 2020/0342032 A1 | 10/2020 | Subramaniam et al. | |
| 2020/0344185 A1 | 10/2020 | Singaraju et al. | |
| 2021/0312260 A1 | 10/2021 | Wu | |
| 2022/0107802 A1 | 4/2022 | Rao | |
| 2022/0230632 A1 | 7/2022 | Maitra | |

OTHER PUBLICATIONS

European Patent Office; International Search Report and Written Opinion issued in Application No. PCT/US2021/061855; 22 pages; dated Jun. 10, 2022.

European Patent Office; Invitation to Pay Additional Fees; App. No. PCT/US2021/061855; 13 pages; dated Mar. 17, 2022.

Gopalakrishnan, K. et al.., "Are Neural Open-Domain Dialog Systems Robust to Speech Recognition Errors in the Dialog History? An Empirical Study;" arXiv.org, arXiv.2008.07683v1; 5 pages; dated Aug. 18, 2020.

European Patent Office; Invitation to Pay Additional Fees; App No. PCT/US2020/064722; 11 pages; dated Aug. 18, 2021.

European Patent Office; International Search Report and Written Opinion of App. No. PCT/US2020/064722; 18 pages; dated Oct. 13, 2021.

* cited by examiner

EXAMPLE-BASED VOICE BOT DEVELOPMENT TECHNIQUES

BACKGROUND

Humans may engage in human-to-computer dialogs with interactive software applications referred to as "bots", "chatbots," "automated assistants", "interactive personal assistants," "intelligent personal assistants," "conversational agents," etc. via a variety of computing devices. As one example, these bots can initiate telephone calls or answer incoming telephone calls, and conduct conversations with humans to perform action(s) on behalf of a third-party. However, functionality of these bots may be limited by pre-defined intent schemas that the bots utilize to perform the action(s). In other words, if a human that is engaged in a dialog with a bot provides a spoken utterance that includes an intent not defined by the pre-defined intent schemas, then the bot will fail. Further, to update these bots, existing intent schemas may be modified or new intent schemas may be added. However, there are virtually limitless intent schemas that may need to be defined to make the bots robust to various nuances of human speech. Extensive utilization of computational resources is required to manually define and/or manually refine such intent schemas. Further, even if a large quantity of intent schemas are defined, a large amount of memory is required to store and/or utilize the large quantity of intent schemas. Accordingly, intent schemas are not practically scalable to the extent of learning the nuances of human speech.

SUMMARY

Implementations disclosed herein are directed to providing a voice bot development platform that enables a voice bot associated with a third-party to be trained based on a plurality of training instances. The voice bot can correspond to one or more processors that utilize a plurality of machine learning (ML) layers, of one or more ML models, for conducting conversations, on behalf of the third-party, for telephone calls associated with the third-party. The voice bot development platform can obtain the plurality of training instances based on user input, from a third-party developer and via a client device associated with the third-party developer, directed to the voice bot development platform. The telephone calls associated with the third-party can include incoming telephone calls initiated by a human via a respective client device and directed to the third-party, and/or outgoing telephone calls initiated by the voice bot via the voice bot development platform and directed to the human or an additional third-party associated with the human. Further, the telephone calls associated with the third-party can be performed using various voice communication protocols (e.g., Voice over Internet Protocol (VoIP), public switched telephone networks (PSTN), and/or other telephonic communication protocols.

For example, assume the third-party for which the voice bot is being trained is a fictitious restaurant entity named Hypothetical Café. Further assume a plurality of training instances for training the voice bot associated with Hypothetical Café are obtained via the voice bot development platform. In this example, the voice bot may subsequently answer incoming telephone calls and perform one or more actions related to restaurant reservations, hours of operation inquiries, carryout orders, and/or any other actions associated with incoming telephone calls directed to Hypothetical Café may be performed during the telephone conversation. Further, the voice bot may additionally or alternatively initiate performing of outgoing telephone calls and perform one or more actions related to inventory orders, information technology requests, and/or any other actions associated with the outgoing telephone calls on behalf of Hypothetical Café may be performed during the telephone conversation. Notably, multiple respective instances of the voice bot may be deployed such that the respective instances of the voice bot can engage in multiple respective conversations with respective humans at any given time. For example, each instance of the voice bot can include corresponding processor(s) utilizing a corresponding instance of the ML layer(s) of the voice bot.

In various implementations, each of the plurality of training instances can include training instance input and training instance output. The training instance input can include a portion of a corresponding conversation, and a prior context associated with the corresponding conversation. For example, the portion of the corresponding conversation can include audio data capturing spoken input of a user (e.g., the third-party developer or another human), a plurality of speech hypotheses generated based on processing the audio data using one or more automatic speech recognition (ASR) models, and/or text provided by the third-party developer. Further, the prior context associated with the corresponding conversation can include preceding audio data of the corresponding conversation that precedes the portion of the conversation, a plurality of preceding speech hypotheses generated based on processing the preceding audio data using one or more of the ASR models, text provided by the third-party developer, and/or metadata associated with the corresponding conversation. The training instance output can include a corresponding ground truth response to at least the portion of the corresponding conversation. For example, the corresponding ground truth response to at least the portion of the corresponding conversation can include audio data capturing a spoken response of a user (e.g., the third-party developer or another human), a plurality of speech hypotheses generated based on processing the audio data using one or more of the ASR models, a ground truth embedding associated with the ground truth response, and/or text provided by the third-party developer.

In some versions of those implementations, the training instance input can be processed, using a plurality of ML layers of one or more ML models, to generate a predicted embedding associated with a predicted response to at least the portion of the conversation. Further, the predicted embedding can be compared, in embedding space, to a ground truth embedding associated with the training instance output. One or more losses can be generated based on a distance metric (e.g., a cosine distance, a Euclidean distance, and/or other distance metrics) between the predicted embedding and the ground truth embedding, and one or more of the plurality of ML layers can be updated based on one or more of the losses. In some additional or alternative versions of those implementations, first ML layers, of the plurality of ML layers, can be utilized to process at least the portion of the corresponding conversation to generate a first embedding, second ML layers, of the plurality of ML layers, can be utilized to process the prior context of the corresponding conversation to generate a second embedding, and the first embedding and the second embedding can be concatenated to generate an embedding associated with a current state of the corresponding conversation. In other words, the embedding associated with the current state of the corresponding conversation encodes the corresponding conversation with respect to a history of the corresponding conversation. In some additional or alternative further versions of those implementations, the plurality of speech hypotheses, whether included in at least the portion of the conversation or generated based on audio data included in at least the portion of the conversation, can be aligned and/or annotated prior to being processed.

In various implementations, one or more of the plurality of training instances can be associated with one or more corresponding feature emphasis inputs. The corresponding feature emphasis input(s) can be obtained based on user input from the third-party developer, and can be provided as an indication of why particular feature(s) of the corresponding training instance is important. The corresponding feature emphasis input(s) can be utilized as part of the training instance input for training the plurality of ML layers as described above, to bias updating of the plurality of ML layers (e.g., weight one or more of the losses), and/or as input to a pointer network that attentions the plurality of ML layers to the corresponding feature emphasis input(s). For example, if the portion of the corresponding conversation utilized as training instance input for the voice bot associated with Hypothetical Café corresponds to "I would like to make a reservation at 6:00 PM for four people", the corresponding feature emphasis input(s) may include an indication that the portion of the corresponding conversation includes a time feature and a party size feature for making a restaurant reservation. As a result, the voice bot may be trained to be attentioned to particular features.

By using corresponding feature emphasis input(s) described herein, various technical advantages can be achieved. As one non-limiting example, the voice bot can achieve a given level of accuracy and/or robustness based on a given quantity of training instances by including the corresponding feature emphasis inputs. Absent including the corresponding feature emphasis inputs, a greater quantity of training instances would be required to achieve the given level of accuracy and/or robustness—or the given level of accuracy and/or robustness would not be achievable. For example, the variance of responses can be restricted to candidate responses for a given voice bot, even though the inputs processed by the given voice bot may be virtually limitless, rather than requiring a pre-defined intent schema for each of the virtually limitless inputs. As a result, the voice bot may be trained in a more quick and efficient manner, thereby conserving computational resources of the client device utilized to train the voice bot and/or network resources in implementations where the training instances, training losses, and/or other training data are transmitted over one or more networks.

In various implementations, the voice bot can be trained to conduct remote procedure calls (RPCs) with one or more third-party systems. The third-party systems can include, for example, reservation systems, inventory systems, status update systems, and/or any other third-party system capable of receiving RPC outbound requests from the voice bot and transmitting responsive RPC inbound requests back to the voice bot. The plurality of training instances obtained by the voice bot development platform can include RPC training instances. Each of the RPC training instances can be either RPC outbound training instances or RPC inbound training instances. In implementations where a given RPC training instance is an RPC outbound training instance, the training instance input may include the portion of the corresponding conversation and the prior context of the corresponding conversation as described above. However, the training instance output may include an indication to generate and transmit an RPC outbound request, and optionally a ground truth response. Continuing with the above Hypothetical Café example, the RPC outbound request may be a structured request of [time=6:00 PM; party size=4] to be transmitted to a reservation system in response to the portion of the corresponding conversation of "I would like to make a reservation at 6:00 PM for four people". Further, the training instance output may also include a corresponding ground truth response of "Let me check" to tell a human that the voice bot is inquiring about availability for the restaurant reservation. In implementations where a given RPC training instance is an RPC inbound training instance, the training instance input may include an RPC inbound request from one or more of the third-party systems. Further, the training instance output may include a corresponding ground truth response to the RPC inbound request. Continuing with the above Hypothetical Café example, the RPC inbound request may be a structured request that indicates whether the desired time is available (e.g., a reservation for four people at 6:00 PM) and optionally one or more alternate times if the desired time is not available. Further, the training instance output may also include a corresponding ground truth response of "We have 6:00 PM available, what's the name?" or "We do not have 6:00 PM available, but we have 7:00 PM and 8:00 PM available" to tell a human that the voice bot is inquiring about availability for the restaurant reservation.

By using RPC training instances described herein, various technical advantages can be achieved. As one non-limiting example, the voice bot can learn how and/or when to transmit requests to third-party systems and how to utilize responses to those requests in resolving the task(s) of a telephone conversation being conducted by the voice bot. As a result, the task(s) can be resolved by the voice bot during the conversation, and can be resolved efficiently and without the need to engage additional human(s) in the conversation. Further, utilization of RPC training instances enables a quantity of RPC requests to be reduced since there are less errant RPC requests, thereby conserving computational resources that would otherwise be consumed in generating the RPC requests and/or network resources that would otherwise be consumed in transmitting the RPC requests over one or more networks.

In some implementations, one or more of the plurality of training instances can be obtained from a corpus of previous telephone calls based on user input from the third-party developer and via the voice bot development platform. The third-party developer may be requested to label one or more of the training instances from the corpus of previous telephone calls via further user input. For example, the voice bot development platform may request that the third-party developer define corresponding feature emphasis input(s) for one or more of the training instances, define RPC requests (if any) for one or more of the training instances, and/or define other labels for one or more of the training instances. The previous telephone calls can include audio data capturing a corresponding conversation between multiple humans and/or a human and a corresponding voice bot. The previous telephone calls can be processed to generate one or more of the training instances. For example, assume the previous telephone calls include audio data capturing a corresponding conversation between a human of a first type (e.g., a customer) and a human of a second type (e.g., an employee). In this example, the audio data corresponding to portions of the corresponding conversation associated with the customer can be identified, and audio data corresponding to corresponding responses associated with the employee that are responsive to the portions of the corresponding conversation associated with the customer can be identified.

The portions of the corresponding conversation associated with the customer can be utilized as part of training instance input, and the corresponding responses associated with the employee can be utilized as part of training instance output. Further, a prior context of the corresponding conversation, at any given point in the corresponding conversation, can also be utilized as part of the training instance input. In implementations where an RPC is conducted during the corresponding telephone call, the third-party developer may need to inject the RPC outbound requests or the RPC inbound requests into those training instances. In some versions of those implementations, the previous telephone calls may be associated with the third-party for which the voice bot is being trained. In some additional or alternative versions of those implementations, the previous telephone calls may be associated with one or more other third-parties that are distinct from the third-party for which the voice bot is being trained.

In some additional or alternative implementations, one or more of the plurality of training instances can be obtained from a demonstrative conversation conducted based on user input from the third-party developer and via the voice bot development platform. The demonstrative conversation can include audio data and/or text capturing a corresponding demonstrative conversation between one or more humans (e.g., that may or may not include the third-party developer). Continuing with the above Hypothetical Café example, a human can provide user input to initiate a corresponding conversation from the perspective of a customer of Hypothetical Café, the human or an additional human can provide subsequent user input from the perspective of an employee of Hypothetical Café, the human can provide further subsequent user input from the perspective of the employee, the human or the additional human can provide yet further subsequent user input from the perspective of the customer, and so on until the demonstrative conversation has ended. The demonstrative conversation can be processed in the same or similar manner described above with respect to the previous telephone calls in the corpus of previous telephone calls generate one or more of the plurality of training instances.

In some additional or alternative implementations, one or more of the plurality of training instances can be obtained directly based on user input from the third-party developer and via the voice bot development platform. For example, the third-party developer may define at least a portion of a corresponding conversation to be utilized as training instance input for a given training instance, and may define a ground truth response to the portion of the corresponding conversation to be utilized as training instance output for the given training instance. Further, the third-party developer may optionally define a prior context for the corresponding conversation to also be utilized as part of the training instance input for the given training instance, or a conversation summary of "prior" portions of the corresponding conversation. Notably, although the third-party developer is defining these portions of the conversation, the third-party developer may not need to define an entire conversation like a demonstrative conversation. As a result, the third-party developer can define one or more training instances that are directed to specific portions of conversation, such as soliciting particular values for parameters of a task (e.g., a restaurant reservation task, a flight change task, an inventory check task, and/or any other tasks that may be performed during a corresponding telephone call), performance of a RPC, introductions, and/or other aspects of a corresponding conversation.

In various implementations, a corresponding conversation summary for each of the telephone calls conducted by the voice bot, upon deployment, can be generated. The corresponding conversation summaries can be presented to the third-party developer via the voice bot development platform to monitor performance of the voice bot. In some implementations, the corresponding conversation summary can include, for example, a natural language summary of each of a corresponding telephone call, a duration of the corresponding telephone call, a result or outcome of the corresponding telephone call, pecuniary information associated with the corresponding telephone call, and/or other information associated with the telephone call. Continuing with the Hypothetical Café example, the corresponding conversation summary may be, for example, "user called to make a reservation, the time was available, the reservation was made". In some additional or alternative implementations, the corresponding conversation summary, when selected, may cause a transcription of the corresponding telephone call to be presented to the third-party developer via the voice bot development platform. The corresponding conversation summaries can be stored in a voice activity database.

By using the techniques described herein, various technical advantages can be achieved. As one non-limiting example, the voice bot development platform enables the voice bot to be trained based on examples of conversations, rather than predefined intent schemas. This allows voice bot behaviors to be easily added or modified by adding new training instances or modifying existing training instances. As a result, voice bots trained using the voice bot development platform described herein are more scalable, and memory consumption is reduced since a large quantity of intent schemas need not be defined. Accordingly, the ML model(s) trained and utilized can be of a smaller memory footprint and can be more robust and/or accurate. Further, the voice bots trained using the voice bot development platform obtain a high level of precision and recall, thereby enabling the telephone calls to be concluded more quickly and efficiently since the voice bots trained using the voice bot development platform are more able to understand the nuances of human speech and respond accordingly.

The above description is provided as an overview of only some implementations disclosed herein. Those implementations, and other implementations, are described in additional detail herein.

DETAILED DESCRIPTION

Figure 1:
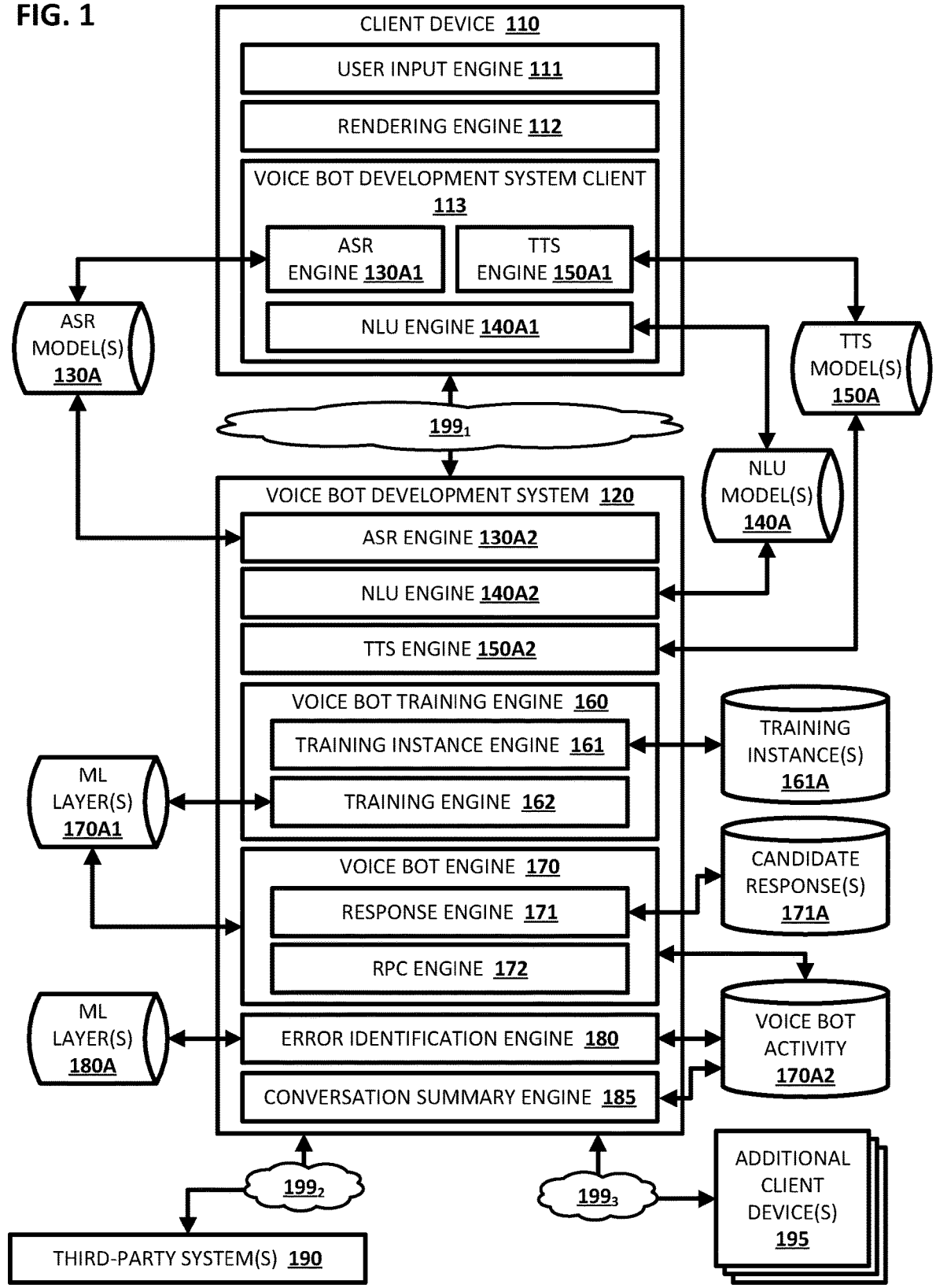
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, user input engine 111, rendering engine 112, and voice bot development system client 113. The client device 110 can be, for example, a standalone assistant device (e.g., having microphone(s), speaker(s), and/or a display), a laptop, a desktop computer, a tablet, a wearable computing device, a vehicular computing device, and/or any other client device capable of implementing the voice bot development system client 113.

The user input engine 111 can detect various types of user input at the client device 110. The user input detected at the client device 110 can include spoken input detected via microphone(s) of the client device 110, touch input detected via user interface input device(s) (e.g., touchscreen) of the client device 110, and/or typed input detected via user interface input device(s) (e.g., via a virtual keyboard on a touchscreen, a physical keyboard, a mouse, a stylus, and/or any other user interface input device of the client device 110) of the client device 110.

The rendering engine 112 can cause output to be visually and/or audibly rendered at the client device 110 via user interface output. The output can include, for example, various types of user interfaces associated with the voice bot development system client 113 that may be visually rendered via a user interface of the client device 110 (e.g., as described with respect to FIGS. 3A, 3B, and 3C), notifications associated with the voice bot development system client 113 that may be visually rendered via the user interface of the client device 110 and/or audibly via speaker(s) of the client device 110, and/or visually and/or audibly render any other output described herein.

The voice bot development system client 113 can include, in various implementations, an automatic speech recognition (ASR) engine 130A, a natural language understanding (NLU) engine 140A1, and a text-to-speech (TTS) engine 150A1. Further, the voice bot development system client 113 can communicate with a voice bot development system 120 over one or more networks 199$_1$ (e.g., any combination of Wi-Fi, Bluetooth, near-field communication (NFC), local area networks (LANs), wide area networks (WANs), ethernet, the Internet, and/or other networks). The voice bot development system client 113 and the voice bot development system 120 form, from the perspective of a user interacting with the client device 110, a logical instance of a voice bot development platform. Although the voice bot development system 120 is depicted in FIG. 1 as being implemented remotely from the client device 110 (e.g., via one or more servers), it should be understood that is for the sake of example and is not meant to be limiting. For example, the voice bot development system 120 can alternatively be implemented locally at the client device 110.

The voice bot development platform can be utilized by a third-party developer (e.g., a user of the client device 110) to train a voice bot as described herein to be deployed for conducting conversations, on behalf of a third-party associated with the third-party developer, for telephone calls associated with the third-party. Notably, the voice bot development platform can be provided by a first-party, and the third-party developer can utilize the voice bot development platform to train the voice bot for the third-party associated with the third-party developer. As used herein, the term first-party refers to an entity that publishes the voice bot development platform, whereas the term third-party refers to an entity that is distinct from the entity associated with the first-party and did not publish the voice bot development system. Accordingly, a third-party developer refers to a user that interacts with the voice bot development platform to train a voice bot associated with a third-party.

The telephone calls described herein can be performed using various voice communication protocols (e.g., Voice over Internet Protocol (VoIP), public switched telephone networks (PSTN), and/or other telephonic communication protocols. As described herein, synthesized speech can be rendered as part of an assisted telephone call, which can include injecting the synthesized speech into the call so that it is perceivable by at least one of the participants of the assisted telephone call. The synthesized speech can be generated and/or injected by the client device 110 that is one of the endpoints of a given telephone call and/or can be generated and/or injected by a server (e.g., that implements the voice bot development system 120) that is connected to the telephone call.

The voice bot development system 120 includes, in various implementations, ASR engine 130A2, NLU engine 140A2, TTS engine 150A2, voice bot training engine 160, voice bot engine 170, error identification engine 180, and conversation summary engine 185. The voice bot training engine 160 can be utilized to train a voice bot to be deployed for conducting conversations, on behalf of a third-party, for telephone calls associated with the third-party, and can include, in various implementations, training instance engine 161 and training engine 162. Further, the voice bot engine 170 can subsequently utilize the trained voice bot to conduct the conversations, on behalf of the third-party, for the telephone calls associated with the third-party, and can include, in various implementations, a response engine 171 and a remote procedure call (RPC) engine 172.

The training instance engine 161 can obtain a plurality of training instances for training the voice bot based on user input provided by the third-party developer and detected at the client device 110 via the user input engine 111. The plurality of training instances can be stored in training instance(s) database 161A, and in association with an indication of the voice bot to be trained based on the plurality of training instances. Each of the plurality of training instances can include training instance input and training instance output. The training instance input can include one or more of: a portion of a corresponding conversation (e.g., audio data and/or a plurality of speech hypotheses corresponding thereto), a prior context associated with the corresponding conversation, an indication of an incoming telephone call, an action or command to initiate performing of an outgoing telephone call, an RPC inbound request, or one or more feature emphasis inputs. The training instance output can include one or more of: a ground truth response to the portion of the corresponding conversation (e.g., audio data and/or a plurality of speech hypotheses corresponding thereto), an introduction for an incoming telephone call, initiating performance of an outgoing telephone call, or an RPC outbound request.

In some implementations, one or more of the plurality of training instances can be obtained from a corpus of previous telephone calls based on the user input. The third-party developer may need to label one or more of the training instances from the corpus of previous telephone calls via user input. The previous telephone calls can include audio data capturing a corresponding conversation between multiple humans and/or a human and a corresponding voice bot. The training instance engine 161 can process the previous telephone calls to generate one or more of the training instances. For example, assume the previous telephone calls include audio data capturing a corresponding conversation between a human of a first type (e.g., a customer) and a human of a second type (e.g., an employee). In this example, the training instance engine 161 can identify audio data corresponding to portions of the corresponding conversation associated with the customer, and identify audio data corresponding to corresponding responses associated with the employee that are responsive to the portions of the corresponding conversation associated with the customer. The portions of the corresponding conversation associated with the customer can be utilized as part of training instance input, and the corresponding responses associated with the employee can be utilized as part of training instance output. Further, a prior context of the corresponding conversation can also be utilized as part of the training instance input. The prior context of the corresponding conversation can include preceding audio data for the corresponding conversation (and/or a plurality of speech hypotheses corresponding thereto or recognized text corresponding thereto), metadata associated with the conversation (e.g., a location of the customer, a time the corresponding telephone call was initiated, whether values for parameters have been solicited, and so on), and/or other contextual information associated with the previous telephone calls.

In some versions of those implementations, the previous telephone calls may be associated with the third-party for which the voice bot is being trained. For example, assume the third-party is a fictitious retail entity named Hypothetical Market that sells various products. The previous telephone calls can include audio data capturing a corresponding conversation between a human of a first type (e.g., a customer), and one or more of a human of a second type (e.g., an employee of Hypothetical Market), a voice bot associated with Hypothetical Market, or an interactive voice response (IVR) system associated with Hypothetical Market. In some additional or alternative versions of those implementations, the previous telephone calls may be associated with one or more other third-parties that are distinct from the third-party for which the voice bot is being trained. In some further versions of those implementations, the previous telephone calls associated with one or more other third-parties that are obtained by the training instance engine 161 may be restricted to other-third parties that are of the same type of entity as the third-party for which the voice bot is being trained (e.g., retailer entities, airline entities, restaurant entities, school or university entities, supplier entities, shipper entities, government entities, and/or any other type of person, place, or thing). Continuing with the above example, the previous telephone calls utilized to generate the training instances for the voice bot associated with Hypothetical Market may be restricted to those associated with other retailers, and optionally other retailers that sell the same or similar products.

In additional or alternative implementations, one or more of the plurality of training instances can be obtained from a demonstrative conversation conducted based on the user input. The demonstrative conversation can include audio data and/or text capturing a corresponding demonstrative conversation between one or more humans (e.g., that may or may not include the third-party developer). For example, assume the third-party is a fictitious retail entity named Hypothetical Market that sells various products. In this example, a human can provide user input to initiate a corresponding conversation from the perspective of a customer of Hypothetical Market, the human or an additional human can provide subsequent user input from the perspective of an employee of Hypothetical Market, the human can provide further subsequent user input from the perspective of the employee, the human or the additional human can provide yet further subsequent user input from the perspective of the customer, and so on (e.g., as described with respect to FIG. 3B). The training instance engine 161 can process the demonstrative conversation to generate one or more of the training instances in a similar manner described above with respect to the corpus of training instances.

In some additional or alternative implementations, one or more of the plurality of training instances can be obtained directly based on the user input. For example, the third-party developer may define at least a portion of a corresponding conversation to be utilized as training instance input for a given training instance, and may define a ground truth response to the portion of the corresponding conversation to be utilized as training instance output for the given training instance. Further, the third-party developer may optionally define a prior context for the corresponding conversation to also be utilized as part of the training instance input for the given training instance, or a conversation summary of "prior" portions of the corresponding conversation. Notably, although the third-party developer is defining these portions of the conversation, the third-party developer may not need to define an entire conversation like a demonstrative conversation. As a result, the third-party developer can define one or more training instances that are directed to specific portions of conversation, such as soliciting particular values for parameters of a task (e.g., a restaurant reservation task, a flight change task, an inventory check task, and/or any other tasks that may be performed during a corresponding telephone call), performance of a RPC, introductions, and/or other aspects of a corresponding conversation.

In various implementations, one or more corresponding feature emphasis inputs may be associated with the one or more of the plurality of training instances. The one or more corresponding feature emphasis inputs can be, for example, natural language input (e.g., spoken and/or typed) that indicates why one or more portions of a particular training instance are important for training the voice bot, such as one or more of the portions of the training instance input include a time feature, a date features, a name feature, an account number feature, an email address feature, a phone number feature, a pecuniary feature, a quantity feature, a product name feature, a location feature, an RPC request feature, and/or any other feature of training instance input or training instance output for a given training instance. The one or more corresponding feature emphasis may be included in the training instance input for a corresponding training instance, utilized to bias updating of the plurality of ML layers that correspond to the voice bot being trained, and/or utilized as input to a pointer network to identify that causes the voice bot to be attentions to the one or more corresponding feature emphasis inputs. As a result, the trained voice bot can be attentioned to occurrences of these features when the voice bot is subsequently deployed by the third-party to conduct conversations.

In implementations where the one or more corresponding feature emphasis inputs are utilized as input to a pointer network, the one or more corresponding feature emphasis inputs, and the portion of the corresponding conversation (and optionally the prior context of the corresponding conversation) can be processed using the pointer network. One or more tokens of the portion of the corresponding conversation can be labeled with one or more values (e.g., probabilities, log likelihoods, binary values, and/or other values) that indicate whether one or more of the tokens of the portion of the corresponding conversation are included in the one or more corresponding feature emphasis inputs. For example, assume the voice bot being trained is associated with Hypothetical Market, assume the training instance input includes at least a portion of a corresponding conversation corresponding to "I would like to purchase Product X if available", and assume the one or more corresponding feature emphasis inputs are indicative of a product feature and an availability feature. In this example, one or more tokens corresponding to "Product X" and "available" may be associated with values that indicate these features are meaningful to correctly respond to the portion of the corresponding conversation. Further, these values can be utilized as part of the training instance input as labels associated with the portion of the corresponding, as side input in processing the training instance input, and/or in biasing updating of the plurality of ML layers. In other words, by processing the corresponding feature emphasis input(s) using the pointer network, the plurality of ML layers can be attentioned to these particular features of the portion of the corresponding conversation that is utilized as part of the training instance input.

Continuing with the Hypothetical Market example, further assume that the corresponding ground truth response indicates that "Product X" is, in fact, "available" for sale. Based on this availability, the predicted response may correspond to "It is available", "It is available, would you like to purchase Product X?", etc. In this example, the third-party developer may also provide user input indicative of a corresponding ground truth response that indicates how to respond when "Product X" is "not available" for sale. Based on this unavailability, the third-party developer may cause the voice bot to learn other predicted responses, such as "It is not available", "It is not available, would you like to purchase Product Y instead?", etc. Accordingly, the third-party developer can interact with the voice bot development system 120, such that the voice bot can learn multiple behaviors based on a single training instance that includes the feature emphasis input. As a result, not only does the voice bot learn particular features of the corresponding conversation that are important for the corresponding conversation, but the voice bot can also learn how to respond in scenarios when the particular features of the corresponding conversation for a given training instance differ from those included in the given training instance by interacting with the voice bot development system 120.

By using corresponding feature emphasis input(s) described herein, various technical advantages can be achieved. As one non-limiting example, the voice bot can achieve a given level of accuracy and/or robustness based on a given quantity of training instances by including the corresponding feature emphasis inputs. Absent including the corresponding feature emphasis inputs, a greater quantity of training instances would be required to achieve the given level of accuracy and/or robustness—or the given level of accuracy and/or robustness would not be achievable. As a result, the voice bot may be trained in a more quick and efficient manner, thereby conserving computational resources of the client device utilized to train the voice bot and/or network resources in implementations where the training instances, training losses, and/or other training data are transmitted over one or more networks.

In various implementations, one or more of the plurality of training instances may be RPC training instances. As used herein, RPC training instances include training instances having corresponding training instance input that includes at least a corresponding RPC inbound request and/or corresponding training instance output that includes at least a corresponding RPC outbound request. An RPC outbound request included in the corresponding training instance output may indicate that the voice bot should generate an RPC request, and transmit the RPC request to one or more third-party systems 190 (e.g., reservation systems, inventory systems, status check systems, and/or any other third-party system) via one or more networks $199_2$. An RPC inbound request included in the corresponding training instance input may indicate that the voice bot should receive a response to the RPC request from one or more of the third-party systems 190 via one or more networks $199_2$, and process the response to generate output based on the response. Although network(s) $199_2$ are depicted separately from network(s) $199_1$ in FIG. 1, it should be understood that is for the sake of clarity and is not meant to be limiting. For instance, network(s) $199_2$ and network(s) $199_1$ may be the same networks or distinct combinations of networks described herein. Since the RPC requests are not directly associated with the corresponding conversations on which the plurality of training instances for training the voice bot are generated (e.g., not captured directly in spoken or typed input of the conversation), the third-party developer may need to define the RPC outbound requests and the RPC inbound requests for the training instances, a particular third-party system of the one or more third party systems 190 to which the RPC outbound request should be directed, a format of the RPC request, a format of the response to the RPC request, and/or any other information associated with the RPC.

In implementations where the user input engine 111 detects spoken input of a user via microphone(s) of the client device 110 in obtaining the training instances as described above, audio data that captures the spoken input can be processed. In some implementations, the ASR engine 130A1 of the client device 110 can process, using ASR model(s) 130A, the audio data that captures the spoken input. In additional or alternative implementations, the client device 110 can transmit the audio data to the voice bot development system 120 over the network(s) $199_1$, and the ASR engine 130A2 can process, using ASR model(s) 130A, the audio data that captures the spoken input. The speech recognition engine(s) 130A1 and/or 130A2 can generate a plurality of speech hypotheses for the spoken input based on the processing of the audio data, and can optionally select a particular speech hypotheses as recognized text for the spoken input based on a corresponding value associated with each of the plurality of speech hypotheses (e.g., probability values, log likelihood values, and/or other values). In various implementations, the ASR model(s) 130A are end-to-end speech recognition model(s), such that the ASR engine(s) 130A1 and/or 130A2 can generate the plurality of speech hypotheses directly using the model. For instance, the ASR model(s) 130A can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms. In other implementations, the ASR model(s) 130A are not end-to-end speech recognition model(s) such that the ASR engine(s) 130A1 and/or 130A2 can instead generate predicted phoneme(s) (and/or other representations). For instance, the predicted phoneme(s) (and/or other representations) may then be utilized by the ASR engine(s) 130A1 and/or 130A2 to determine a plurality of speech hypotheses that conform to the predicted phoneme(s). In doing so, the ASR engine(s) 130A1 and/or 130A2 can optionally employ a decoding graph, a lexicon, and/or other resource(s). In various implementations, a corresponding transcription can be rendered at the client device 110 (e.g., in association with training instance input, training instance output, corresponding feature emphasis input(s), a demonstrative conversation, and/or other aspects of the voice bot development platform).

In some versions of those implementations, the NLU engine 140A1 of the client device 110 and/or the NLU engine 140A2 of the voice bot development system 120 can process, using NLU model(s) 140A, the recognized text generated by the ASR engine(s) 130A1 and/or 130A2 to determine intent(s) included in the spoken input. For example, if the client device 110 detects spoken input of "add training instance input of 'do you have any reservations at 6:30 PM for two people'" from the third-party developer (e.g., as part of standalone spoken input defining a training instance input), the client device 110 can process, using the ASR model(s) 130A1 and/or 130A2, audio data that captures the spoken input to generate recognized text corresponding to the spoken input, and can process, using the NLU model(s) 140A, the recognized text to determine at least an intent of adding training instance input (e.g., that may include the audio data and/or the corresponding speech hypotheses for the spoken input).

In some versions of those implementations, the TTS engine 150A1 of the client device 110 and/or the TTS engine 150A2 of the voice bot development system 120 can generate synthesized speech audio data that captures synthesized speech. The synthesized speech can be rendered at the client device 110 using the rendering engine 112 and via speaker(s) of the client device 110. The synthesized speech may capture any output generated by the voice bot development described herein, and may include, for example, an indication that a training instance has been added (or repeat the particular training instance input, training instance output, feature emphasis input(s), etc.), a notifications that requests the third-party developer add one or more additional training instances or a group of training instances (and optionally those associated with particular feature(s)), a notifications that requests the third-party developer modify one or more existing training instances or a ground of training instances (and optionally those associated with particular feature(s)), an indication that training of the voice bot has been initiated, completed, or a status update on training of the voice bot, and/or any other information related to the voice bot or the voice bot development platform that can be audibly conveyed to the third-party developer.

The training engine 162 can utilize the plurality of training instances obtained by the training instance engine 161 (e.g., stored in the training instance(s) database 161A) to train the voice bot (e.g., ML layer(s) thereof). The voice bot can correspond to one or more processors that utilize a plurality of machine learning (ML) layers of one or more ML models (e.g., stored in ML layer(s) database 170A1) for conducting conversations, on behalf of the third-party, for telephone calls associated with the third-party. The plurality of ML layers may correspond to those of transformer ML models (e.g., input layers, encoding layers, decoding layers, feed-forward layers, attention layers, output layers, and/or other ML layers), unidirectional and/or bidirectional RNN models (e.g., input layers, hidden layers, output layers, and/or other ML layers), and/or other ML layers of other ML models.

Figure 2A:
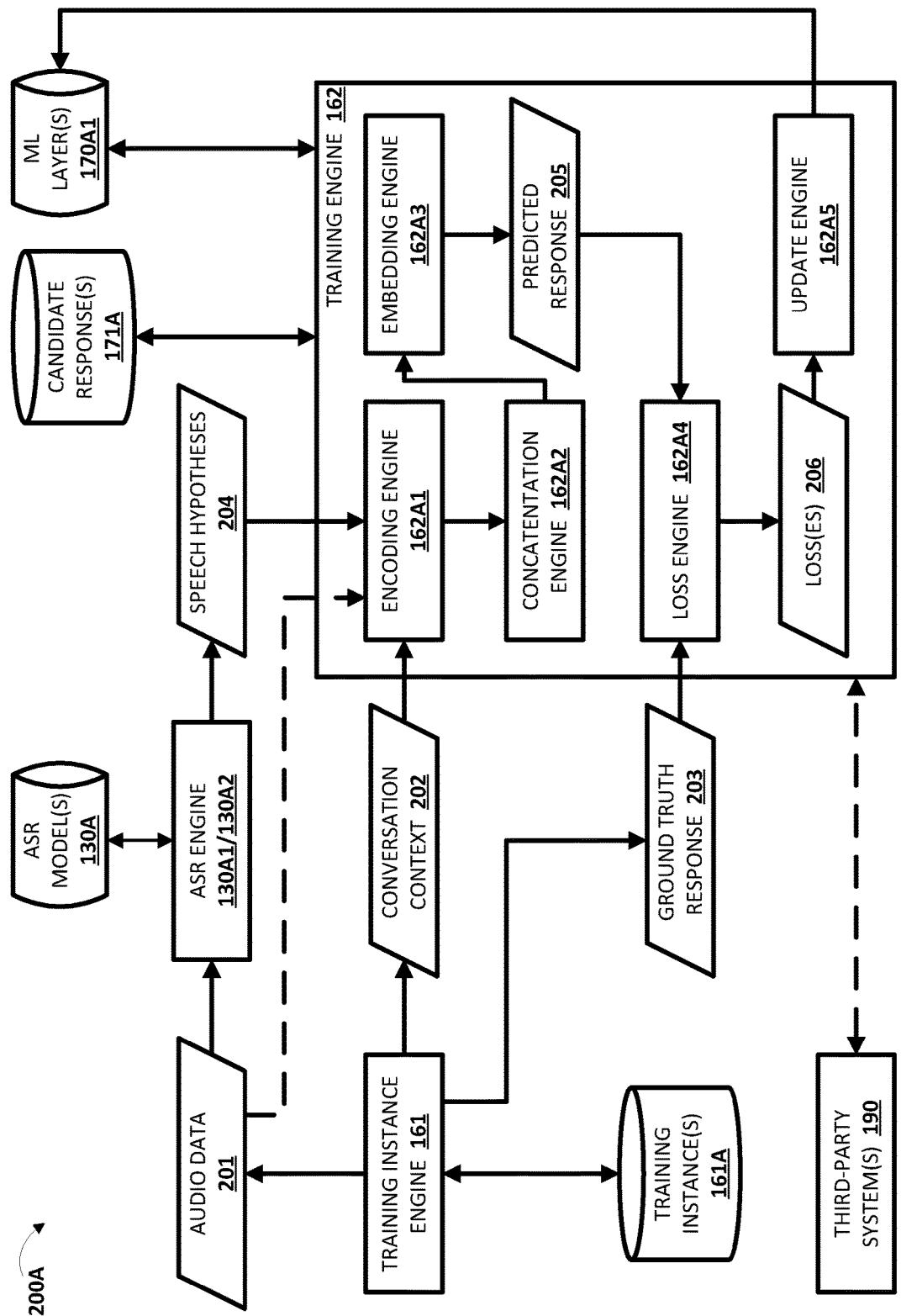
FIG. 2A depicts an example process flow for training a voice bot, in accordance with various implementations.

For example, and referring to FIG. 2A, an example process flow 200A for training a voice bot is depicted. In some implementations, training instance engine 161 can obtain a given training instance, from among a plurality of training instances associated with the voice bot stored in the training instance(s) database 161A. In some implementations, training instance input, for the given training instance, can include at least audio data 201 corresponding to a portion of a corresponding conversation and a conversation context 202 for the corresponding conversation. Further, training instance output, for the given training instance, can include a ground truth response 203 to the portion of the conversation. The audio data 201 can be processed by the ASR engine(s) 130A1 and/or 130A2, using the ASR model(s) 130A, to generate a plurality of speech hypotheses 204. In other implementations, the training instance input may include the plurality of speech hypotheses 204 generated based on the audio data 201, but may not include the audio data 201 itself.

In some implementations, the encoding engine 162A1 can process, using first ML layers of a plurality of ML layers stored in the ML layer(s) database 170A1, the plurality of speech hypotheses 204 to generate a first encoding. The encoding engine 162A1 can process, using the first ML layers of second ML layers of the plurality of ML layers stored in the ML layer(s) database 170A1, the conversation context 202 to generate a second encoding. Further, concatenation engine 162A2 can concatenate the first encoding and the second encoding to generate a concatenated encoding. The concatenated encoding may represent a current state of the corresponding conversation. For example, the concatenated encoding can encode the history of the conversation and a most recent portion of the conversation to encode the entire conversation as a whole.

By encoding the current state of the corresponding conversation, a dialog of the conversation may be tracked, thereby enabling the voice bot to model and/or learn states of the corresponding conversation. Accordingly, the resulting trained voice bot may learn to solicit corresponding values for parameter(s) associated with a task being performed via the corresponding telephone call. For example, assume the training instance input includes at least a portion of a corresponding conversation corresponding to "Hello, do you have any of Product X available for sale". In this example, the voice bot is trained to understand the human is requesting an inventory check for Product X. Further, by encoding the conversation context 202 of the corresponding conversation, the voice bot is also trained to understand that, if Product X is available, the human has not provided any corresponding values for a name parameter associated with the purchase or place Product X on hold, for a pecuniary parameter associated with the purchase of Product X, for an address parameter if the human desires to have Product X shipped to his or her residence, and so on. Thus, the voice bot can be trained to subsequently prompt the human for the corresponding values for one or more of these parameters by tracking the state of the dialog.

Moreover, embedding engine 162A3 can process the concatenated encoding, using one or more of the plurality of ML layers, to generate a predicted embedding associated with a predicted response 205 (e.g., performing an RPC with the third third-party system(s), synthesized speech or text to be provided responsive to the training instance input, answering an incoming telephone call, initiating an outgoing telephone call, and/or other responses that are predicted to be responsive to the training instance input). The predicted response 205 may be selected from a plurality of candidate response in a candidate response(s) database 171A (e.g., that includes the ground truth response 203 and a plurality of additional candidate responses). In generating the predicted embedding, a size of the concatenated encoding may be reduced to a fixed dimensionality. This enables the predicted embedding associated with the predicted response 205 to be easily compared, in embedding space, to other embeddings described with respect to loss engine 162A4.

In some versions of those implementations, and prior to processing of the plurality of speech hypotheses 204, the training engine 162 can cause the plurality of speech hypotheses to be aligned. For example, assume the plurality of speech hypotheses capture spoken input of "for 4 PM". In this example, the plurality of speech hypotheses can be aligned as [for, #empty, 4 PM; for, 4, PM; four, four, PM], such that each of the plurality of aligned speech hypotheses can be subsequently processed in combination with one another. In some further versions of those implementations, the training engine 162 can further cause the plurality of aligned speech hypotheses to be annotated. Continuing with the above example, the plurality of aligned speech hypotheses can be annotated as [for, #empty (@null), 4 PM (@time); for, 4 (@time), PM (@time); four (@time), four (@time), PM (@time)].

In implementations where the training instance input also includes the audio data 201, the encoding engine 162A1 can generate, in addition to or lieu of the encoding generated based on the plurality of speech hypotheses, an encoding associated with the audio data 201. In these implementations, the concatenation engine 162A2 can process the encoding associated with the audio data 201 and the encoding associated with the conversation context 202 to generate a concatenated encoding. Further, the embedding engine 162A3 can process the concatenated encoding, using one or more of the plurality of ML layers, to generate the predicted embedding associated with the predicted response 205. In various implementations, and although not depicted in FIG. 2A, the encoding engine 162A1 may additionally process one or more corresponding feature emphasis inputs associated with the given training instance along with the audio data 201 and/or the plurality of speech hypotheses 204.

Although the encoding engine 162A1, the concatenation engine 162A2, and the embedding engine 162A3 are described herein as performing particular functions in a particular order, it should be understood that performance of these particular may be reordered, and/or one or more of these engines may be omitted. For example, the encoding engine 162A1 may be omitted, and the embedding engine 162A3 can process the plurality of speech hypotheses 204 and the conversation context 202, using respective ML layers of the plurality of ML model(s), to generate the predicted embedding associated with the predicted response to at least the portion of the corresponding conversation associated with the plurality of speech hypotheses.

Further, the loss engine 162A4 can, in various implementations, compare, in embedding space, the predicted embedding associated with the predicted response 205 to a ground truth embedding associated with the ground truth response 203 to generate one or more losses 206. The predicted embedding and the ground truth embedding can correspond to lower dimensional representations of the predicted response 205 and the corresponding ground truth response 203, respectively. The embedding space allows for comparison of these lower dimensional embeddings. Further, the predicted embedding associated with the predicted response 205 should be close, in the embedding space, to the corresponding ground truth embedding associated with the corresponding ground truth response 203. In other words, in processing at least the portion of the corresponding conversation and the prior context of the conversation, the system should predict a response similar to an actual response to at least the portion of the corresponding conversation. For example, a distance metric (e.g., a cosine similarity distance, a Euclidean distance, and/or other distance metrics) between the predicted embedding and the corresponding ground truth embedding, in the embedding space, can be determined, and one or more of the losses 206 can be generated based on the distance metric.

In some implementations, the ground truth embedding associated with the ground truth response 203 can be generated, while training the voice bot based on the given training instance, using distinct ML layers of a distinct ML model (not depicted) that are distinct from the plurality of ML layers utilized in generating the predicted embedding associated with the predicted response 205 (e.g., dot product architecture). The ground truth embedding may then be stored in the candidate response(s) database 171A to be utilized as one of a plurality of candidate responses at inference. Notably, the distinct ML layers may additionally or alternatively be updated based on one or more of the losses 206 such that the distinct ML layers learn the respective portion(s) of the embedding space to assign to the ground truth embeddings (and one or more of the plurality of ML layers and/or the distinct ML layers may optionally remain fixed). Moreover, corresponding embeddings associated with one or more responses that are incorrect responses to the portion of the corresponding conversation may additionally or alternatively be utilized as negative examples to further distinguish, in the embedding space, the correct embeddings for the portion of the corresponding conversation. Subsequent to updating of the distinct ML layers, a plurality of additional candidate responses can be processed, using the updated distinct ML layers, to generate corresponding candidate response embeddings. These candidate response embeddings and the corresponding candidate responses can also be stored in the candidate response(s) database 171A even though they were not utilized in training the voice bot. Accordingly, at inference, the distinct ML layers may be omitted since the candidate response embeddings and the corresponding candidate responses are known. In additional or alternative implementations, the ground truth embedding can be stored in association with the ground truth response for the given training instance in the training instance(s) database 161A.

Update engine 162A5 can cause one or more of the plurality of ML layers to be updated based on one or more of the losses 206 (and one or more of the plurality of ML layers may optionally remain fixed). For example, the update engine 162A5 can cause one or more of the losses 206 to be backpropagated across one or more of the plurality of ML layers to update respective weights of one or more of the plurality of ML layers. In some implementations, the update engine 162A5 can utilize one or more of the corresponding feature emphasis inputs for the given training instance to bias updating one or more of the plurality of ML layers. For example, prior to updating the respective weights of one or more of the plurality of ML layers, the loss engine 162A4 or the update engine 162A5 can weight one or more of the losses. As a result, one or more of the plurality of ML layers can be attentioned to subsequent occurrences of the one or more of the corresponding feature emphasis inputs.

The one or more of the plurality of ML layers can be further updated based on an additional training instance(s) obtained by the training instance engine 161 in the same or similar manner described above. In some implementations, the voice bot may be trained in this manner until one or more conditions are satisfied. The one or more conditions can include, for example, validation of one or more of the plurality of ML layers or the plurality of additional ML layers that are updated, convergence of one or more of the plurality of ML layers or the plurality of additional ML layers that are updated (e.g., zero loss or within a threshold range of zero loss), determination that one or more of the plurality of ML layers or the plurality of additional ML layers performs better (e.g., with respect to precision and/or recall) than the instance of the voice bot currently being utilized (if any), occurrence of training based on at least a threshold quantity of training instances, and/or a duration of training based on the training instances.

Although the voice bot is described as being trained in a particular manner and using a particular architecture, it should be understood that is for the sake of example and is not meant to be limiting. For example, in training the voice bot associated with Hypothetical Market, a voice bot associated with a fictitious restaurant named Hypothetical Café can be utilized as a baseline voice bot. In this example, one or more transfer learning techniques (e.g., meta learning) may be utilized to adapt the voice bot associated with Hypothetical Café (or output generated based on those training instances) for the voice bot associated with Hypothetical Market. For instance, the training instance input may include an additional input that indicates the voice bot associated with Hypothetical Market is being trained for a different, retail related purposes, whereas the original voice bot associated with Hypothetical Café was trained for restaurant purposes.

Referring briefly back to FIG. 1, and subsequent to training the voice bot, the voice bot engine 170 can cause subsequently utilize the trained voice bot to conduct the conversations, on behalf of the third-party, for the telephone calls associated with the third-party, and can include, in various implementations, a response engine 171 and a remote procedure call (RPC) engine 172. The trained voice bot can conduct the telephone calls with a human or an additional voice bot, that initiated an incoming telephone call or that answered an outgoing telephone call, via respective additional client devices 195. The telephone calls can be conducted over one or more of networks $199_3$ using voice communication protocols (e.g., Voice over Internet Protocol (VoIP), public switched telephone networks (PSTN), and/or other telephonic communication protocols. Notably, these calls may be cloud-based telephone calls, such that the client device 110 utilized in training the voice bot is not an endpoint of the corresponding telephone calls. Rather, the voice bot development system 120 (e.g., one or more servers) may serve as an endpoint of the telephone call along with one of the additional client devices 195.

Figure 2B:
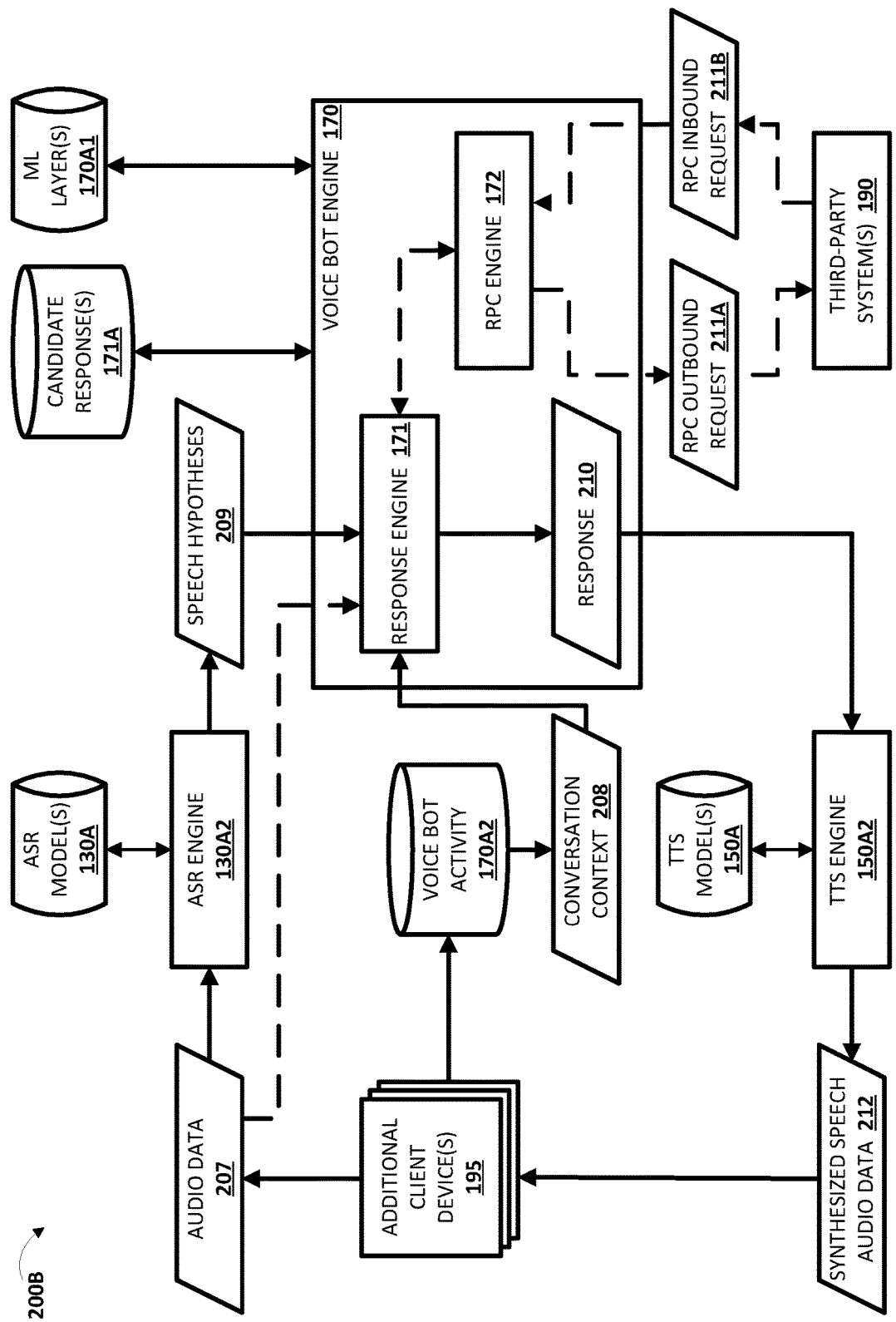
FIG. 2B depicts an example process flow for using a trained voice bot, in accordance with various implementations.

For example, and referring specifically to FIG. 2B, assume the third-party for which the voice bot is trained is a fictitious retail entity named Hypothetical Market that sells various products. Further assume a human provides user input at a respective one of the additional client devices 195 to initiate a telephone call with Hypothetical Market, the voice bot answers the incoming telephone call initiated by the human, and causes synthesized speech audio data (e.g., generated using the TTS model(s) 150A) that captures synthesized speech corresponding to a particular introduction for the voice bot to be audibly rendered at the respective one of the additional client devices 195 such that the synthesized speech is perceivable to the human via speaker(s) of the respective one of the additional client devices 195. Further assume the human provides a spoken utterance of "Hello, do you have any of Product X available for sale" in response to the audible rendering of the synthesized speech audio data. The spoken utterance may be captured in audio data 207 that is transmitted to the voice bot development system 120 of FIG. 1 over one or more of the networks.

The ASR engine 130A2 can process the audio data 207, using the ASR model(s) 130A, to generate a plurality of speech hypotheses 209 corresponding to the spoken utterance. The voice bot engine 170 can optionally cause the plurality of speech hypotheses 209 to be aligned and/or annotated. Further, the response engine 171 can process, using a plurality of ML layers stored in the ML layer(s) database 170A1, one or more of the plurality of speech hypotheses 209, conversation context 208 for the incoming telephone call initiated by the human (e.g., stored in a voice activity database 170A2), and/or the audio data 207 to generate a response embedding. In some implementations, the audio data 207 may only be processed by the ASR engine 130A2 and/or the plurality of speech hypotheses 209 may only be processed by the response engine 171 in response to determining that the spoken utterance provided by the user is complete. For example, the voice bot development system 120 can process the audio data, using endpoint model(s) that are trained to detect when the human is done providing spoken utterances, to determine that the human is done providing the spoken utterance after speaking the word "sale".

In some implementations, the response engine 171 can compare the response embedding to a plurality of candidate response embeddings associated with the plurality of candidate responses stored in the candidate response(s) database 171A. Moreover, the response engine 171 can select a given one of the plurality of candidate responses as a response 210 to the spoken utterance based on a distance metric, in embedding space, between the response embedding and one or more of the plurality of candidate response embeddings associated with the plurality of candidate responses. For example, the candidate response associated with a corresponding distance metric that satisfies a distance threshold may be selected as the response 210. The response 210 can be processed by the TTS engine 150A2, using the TTS model(s) 150A, to generate synthesized speech audio data 212 that captures the response 210. Further, the synthesized speech audio data 212 can be audibly rendered at the respective one of the additional client devices 195.

In some implementations, the response engine 171 can determine that an RPC request is required to respond to the spoken utterance captured in the audio data 207. In some versions of those implementations, the RPC engine 172 can generate an RPC outbound request 211A, and transmit the RPC outbound request to one or more third-party systems 190. Continuing with the above example, the response engine 171 may determine that an RPC request is required to determine whether Hypothetical Market has any inventory of "Product X" for sale. Accordingly, the RPC engine 172 can generate a structured request (e.g., inventory=Product X, intent=sale) as the RPC outbound request 211A that is transmitted to an inventory third-party system 190. The RPC engine 172 can receive, responsive to the RPC outbound request 211B, an RPC inbound request 211B. For example, the RPC inbound request 211B may indicate that "Product X" is either available or unavailable for sale via Hypothetical Market. In implementations where the response engine 171 determines that an RPC request is required, one or more instances of the synthesized speech audio data associated with the RPC outbound request 211A (e.g., "hold on a second while I check") and/or one or more instances of the synthesized speech audio data associated with the RPC inbound request 211A (e.g., "yes, we have Product X available for sale, would you like to purchase it?") can be rendered at the respective one of the additional client devices 195 in the same or similar manner described above.

This process may be repeated to generate corresponding responses for spoken utterances provided by the human until the telephone call is completed. The telephone call with the human may be stored in the voice activity database 170A2. For example, the voice activity database 170A2 may include, for a given telephone call, audio data corresponding to the spoken utterances of the human, synthesized speech audio data corresponding to the synthesized speech of the voice call, a result of the given telephone call, a duration of the given telephone call, a time and/or date associated with the given telephone call, and/or other information derived from the given telephone call. In some implementations, the voice bot may solicit consent from the human to interact with the voice bot prior to engaging in the conversation. In implementations where the human consents to engaging in the conversation with the voice during the telephone call, the voice bot may engage in the conversation with the user. In implementations where the human does not consent to engaging in the conversation with the voice during the telephone call, the voice bot may end the telephone call or request that an additional human that is associated with the third-party join the telephone call.

Referring back to FIG. 1, the error identification engine 180 can process, using a plurality of ML layers of a ML model stored in ML layer(s) database 180A, voice bot activity stored in the voice bot activity database 170A2 to identify any behavioral errors of the voice bot. The identified behavioral errors can be classified into one or more disparate categories of errors based on output generated using the plurality of ML layers. The one or more disparate categories of errors can include, for example, the voice bot terminating the call prematurely, the voice bot failing to provide a response and timing out, the voice bot failing to solicit corresponding values for parameters needed to complete a desired action of the human, the voice bot failing to recognize corresponding values for parameters that were provided by the human to complete a desired action of the human, the voice bot failing to perform a RPC when needed, the voice bot performing a RPC with an incorrect third-party system, and/or any other behavioral error of that voice bot that may occur during the corresponding telephone calls. In other words, the identified behavioral errors can be classified into the one or more of the same disparate categories of errors if a root cause of the identified behavioral error is the same.

In some implementations, the error identification engine 180 can automatically perform one or more actions to correct these identified behavioral issues. The one or more actions can include, for example, synthesizing new training instances for re-training of the voice bot and/or modifying existing training instances for re-training the voice bot. For example, the error identification engine 180 may determine that the voice bot has confused multiple features included in portions of a corresponding conversation, but there is a sparsity issue in training instances that includes these features that prevents the voice bot from being able to consistently distinguish the multiple features. In this example, the error identification engine 180 may generate synthetic training instances that include one or more of the multiple features to address the sparsity issue, and cause the voice bot to be re-trained based on the plurality of training instances associated with the voice bot, including the generated synthetic training instances. As another example, the error identification engine 180 may additionally or alternatively, modify re-label one or more existing training instances to further distinguish one or more of the multiple features.

In some additional or alternative implementations, the error identification engine 180 can cause a notification to be presented to the third-party developer. The notification can include an indication of one or more actions that, when performed by the third-party developer, should correct these identified behavioral issues. The notification can be rendered along with the conversation summary for the corresponding call, or via a separate interface (e.g., a pop-up notification, a notifications interface, etc.). The one or more actions can include, for example, adding new training instances for re-training of the voice bot and/or modifying existing training instances for re-training the voice bot. For example, the error identification engine may present one or more training instances, and prompt the third-party developer to identify one or more corresponding feature emphasis inputs for one or more of the multiple training instances, add more training instances that include features of one or more of the training instances, re-label the training instances to include one or more different labels, and/or any other action that may correct the root cause of the identified behavioral errors.

The conversation summary engine 185 can generate, based on the voice bot activity stored in the voice bot activity database 170A2, a corresponding conversation summary for each of the telephone calls conducted by the voice bot. The corresponding conversation summaries can be rendered at a user interface of the client device 110 using the rendering engine 112. In some implementations, the corresponding conversation summary can include, for example, a natural language summary of each of a corresponding telephone call, a duration of the corresponding telephone call, a result or outcome of the corresponding telephone call, pecuniary information associated with the corresponding telephone call, and/or other information associated with the telephone call. Continuing with the Hypothetical Market example, the corresponding conversation summary may be, for example, "user called to inquire about availability of Product X, I checked to make sure Product X was available, the user purchased Product X for $100". In some additional or alternative implementations, the corresponding conversation summary, when selected, may cause a transcription of the corresponding telephone call to be rendered at the user interface of the client device 110 using the rendering engine 112. The corresponding conversation summaries are described below (e.g., with respect to FIG. 3C).

Accordingly, the voice bot development platform described herein enables the third-party developer associated with the third-party to train a voice bot, monitor performance of the voice bot, and subsequently update the voice bot based on any identified behavioral errors of the voice bot. Notably, the voice bot development platform is example-based in that the voice bot is trained based on portions of conversations, and the voice bot is updated based on adding more examples or modifying existing examples. As a result, the third-party developer need not have any extensive knowledge of ML or how to define various intent schemas, which may be required to develop a rules-based voice bot.

Although the voice bots are described herein as being subsequently deployed for conducting conversations, on behalf of a third-party, for telephone calls associated with the third-party, it should be understood that is for the sake of example and is not meant to be limiting. For example, the voice bots described herein can be deployed in any scenario in which a human can engage in a human-to-computer dialog with a given voice bot. For instance, the given voice bot can be trained to conduct conversations with humans at a drive thru via a drive thru system, conduct conversations with humans as an automated assistant via a client device of the human, and/or any other domain outside of telephone calls where a human can engage in a human-to-computer dialog with a given voice bot. Accordingly, it should be understood that the behavior of these voice bots may be based on the training instances utilized to train the corresponding voice bots.

By using the techniques described herein, various technical advantages can be achieved. As one non-limiting example, the voice bot development platform enables the voice bot to be trained based on examples of conversations, rather than predefined intent schemas. This allows voice bot behaviors to be easily added or modified by adding new training instances or modifying existing training instances. As a result, voice bots trained using the voice bot development platform described herein are more scalable, and memory consumption is reduced since a large quantity of intent schemas need not be defined. Accordingly, the ML model(s) trained and utilized can be of a smaller memory footprint and can be more robust and/or accurate. Further, the voice bots trained using the voice bot development platform obtain a high level of precision and recall, thereby enabling the telephone calls to be concluded more quickly and efficiently since the voice bots trained using the voice bot development platform are more able to understand the nuances of human speech and respond accordingly.

Figure 3A:
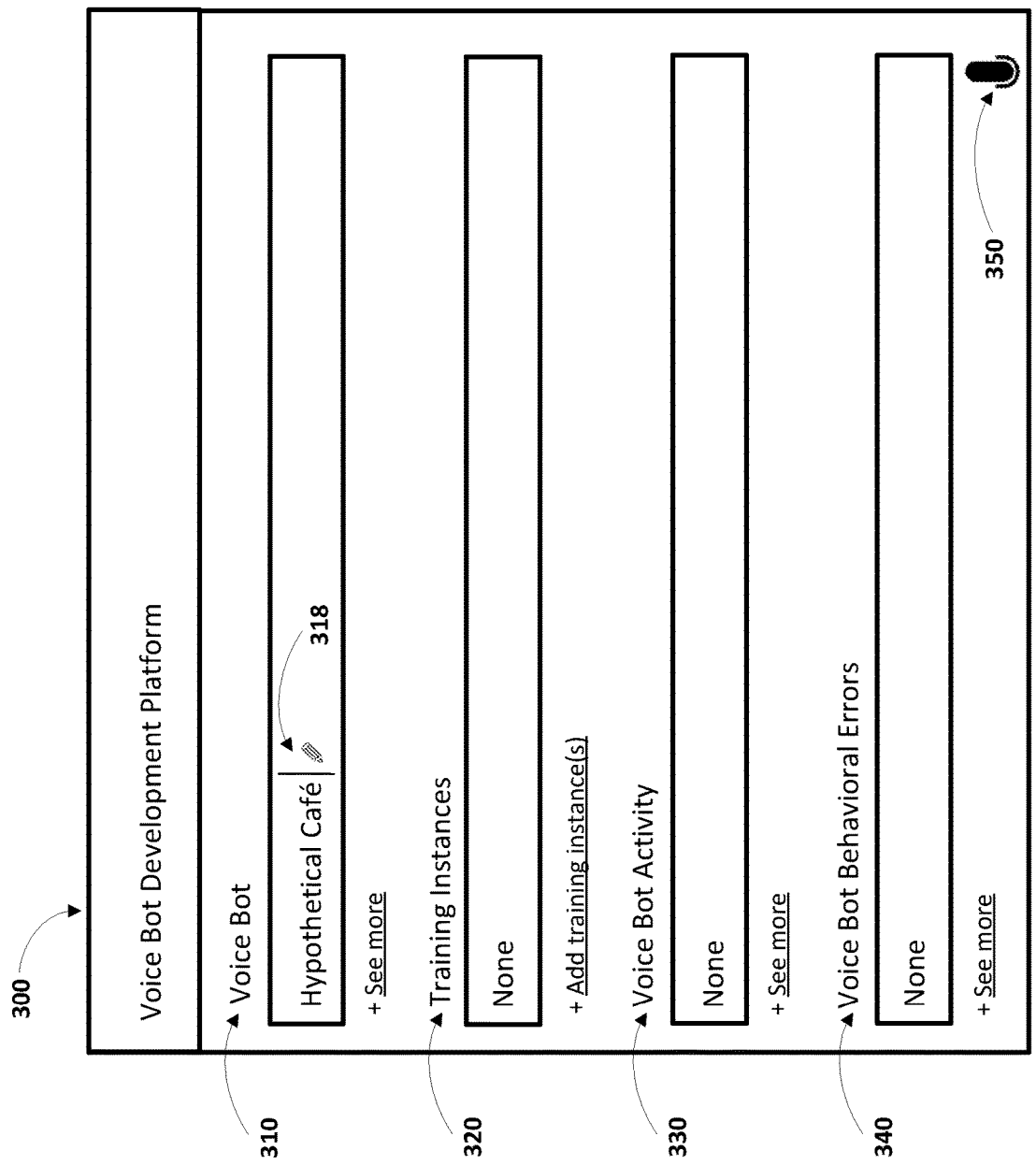
FIGS. 3A, 3B, and 3C depict various non-limiting examples of a user interface associated with a voice bot development platform, in accordance with various implementations.
Figure 3B:
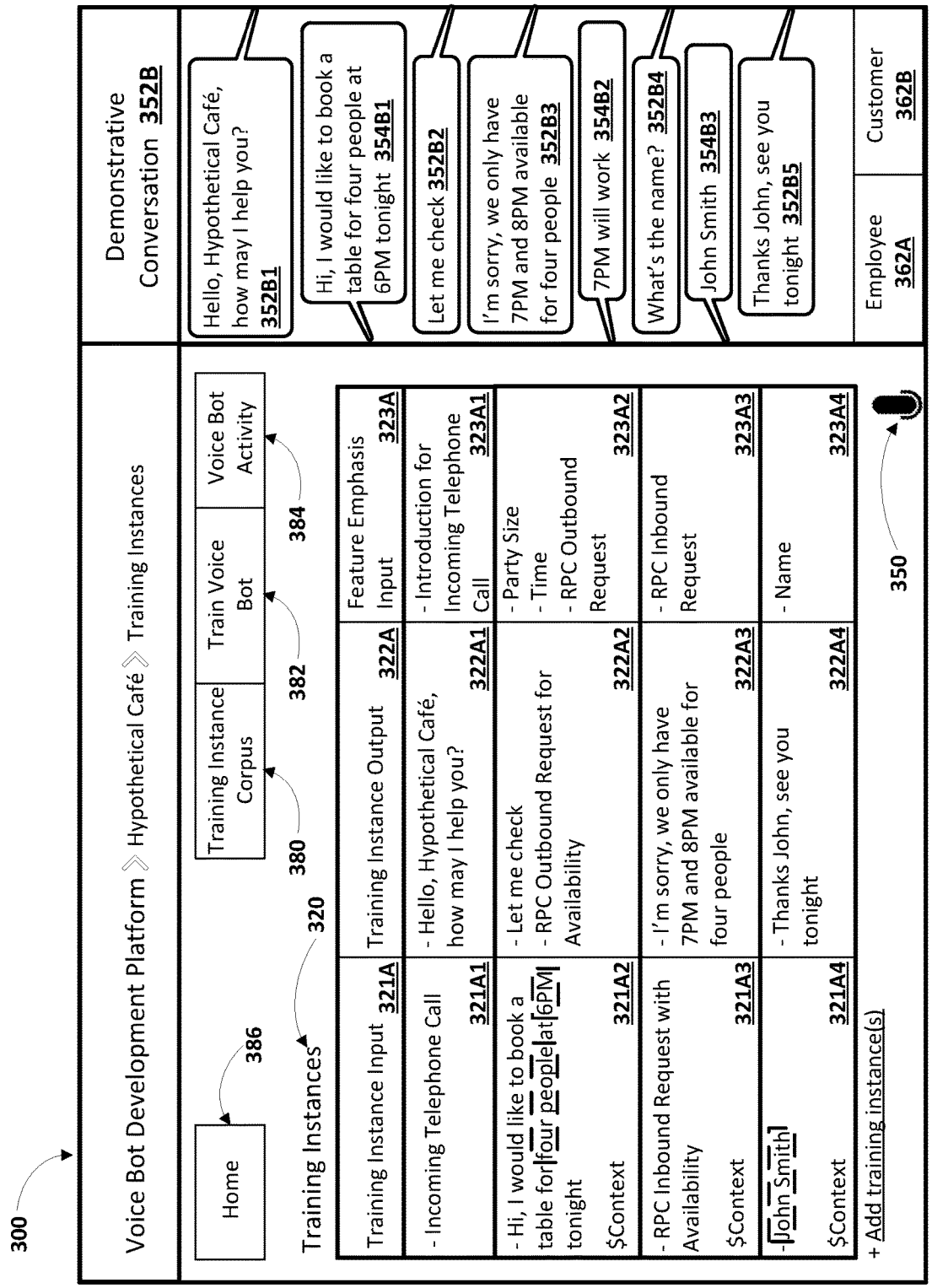
Figure 3C:
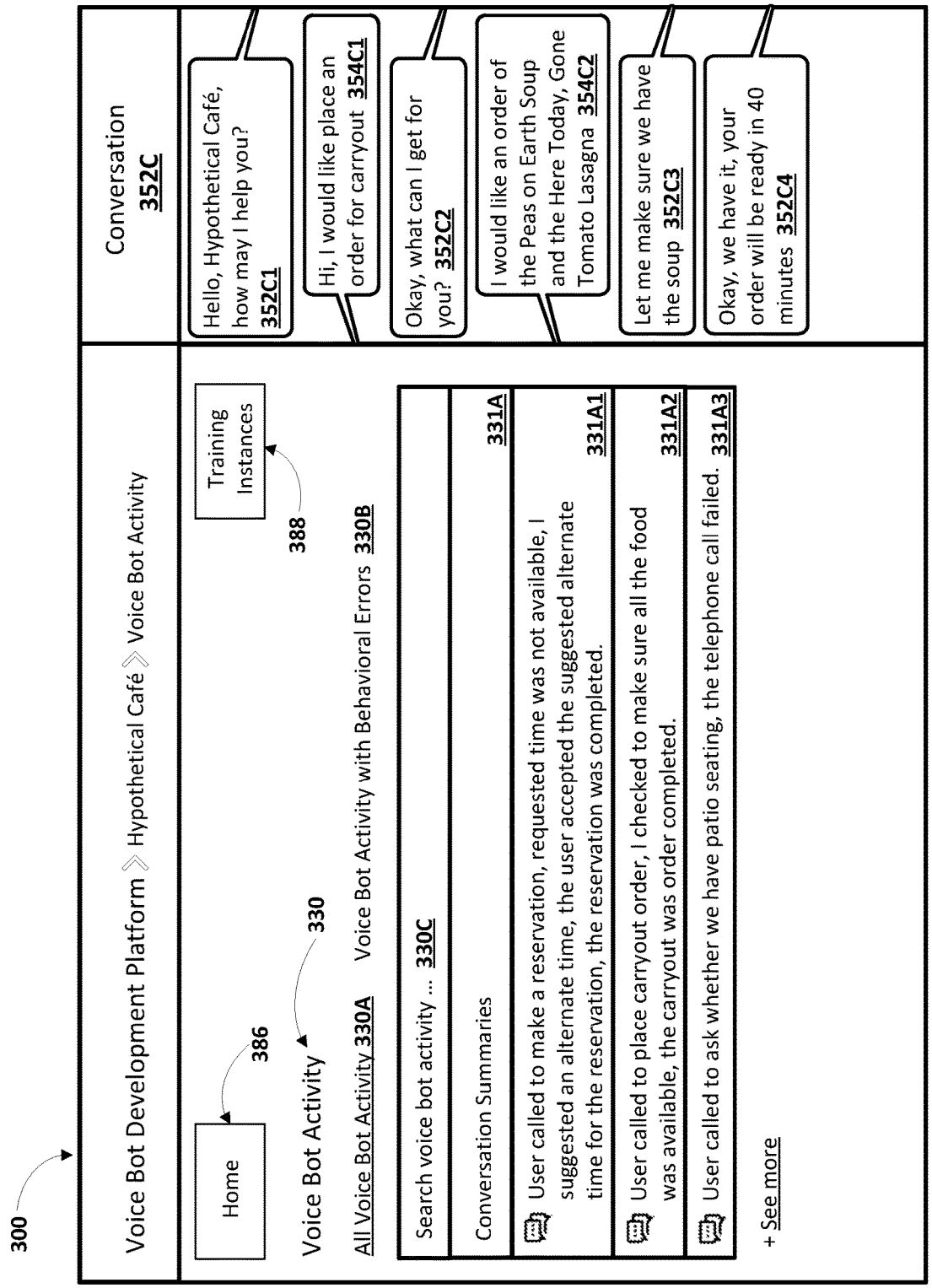

Turning now to FIGS. 3A, 3B, and 3C, various non-limiting examples of a user interface 300 associated with a voice bot developer platform are depicted. A third-party developer can interact with the voice bot development platform using a client device that includes a voice bot development system client or a voice bot development system (e.g., the client device 110 of FIG. 1). By interacting with the voice bot development platform, the third-party developer can train a voice bot that, when deployed, can conduct conversations, on behalf of a third-party associated with the third-party developer, for incoming telephone calls directed to the third-party and/or outgoing telephone calls initiated by on behalf of the third-party. For the sake of example throughout FIGS. 3A, 3B, and 3C, assume the third-party developer is creating a new voice bot to conduct conversations for telephones calls associated with Hypothetical Café—a fictitious restaurant.

Referring specifically to FIG. 3A, a home screen or landing page for the voice bot development platform is depicted as being visually rendered on the user interface 300. In various implementations, the third-party developer may be presented with various graphical elements on the home screen or landing page. For example, the user interface 300 may include a voice bot graphical element 310 that provides a snippet of any unique identifiers associated with voice bots developed by the third-party developer and/or any voice bots that are associated with the third-party (e.g., Hypothetical Café). In creating a new voice bot, the third party developer can provide a unique identifier in a text entry field 318 to be associated with the new voice bot being developed. For example, as shown in FIG. 3A, the third-party developer may provide typed input of "Hypothetical Café" in the text entry field 318, or spoken input that captures audio data corresponding to "Hypothetical Café" (and optionally in response to a user selection of the microphone interface element 350). In some implementations, the third-party developer may select a "see more" graphical element as shown in FIG. 3A to expand the snippet of voice bots (if any others exist) to include additional voice bots or launch a voice bot interface on the user interface 300.

Further, the user interface 300 may additionally or alternatively include a training instances graphical element 320 that provides a snippet of a plurality of training instances utilized in creating the new voice bot. Each of the plurality of training instances can include training instance input and training instance output. The training instance input can include, for example, at least a portion of a corresponding conversation and a prior context of the corresponding conversation, and the training instance output can include, for example, a corresponding ground truth response to at least the portion of the corresponding conversation. The plurality of training instances can be obtained, for example, from an existing corpus of telephone calls associated with Hypothetical Café (or another restaurant entity), from a demonstrative conversation between one or more humans (e.g., that may or may not include the developer), and/or from one or more other spoken utterances of one or more humans (e.g., that may or may not include the developer) that correspond to a snippet of conversation. Obtaining the plurality of training instances and training the voice bot associated with Hypothetical Café is described below (e.g., with respect to FIG. 3B). In some implementations, the third-party developer may select an "add training instance(s)" graphical element as shown in FIG. 3A to add training instances for training the voice bot associated with Hypothetical Café or launch a training instances interface on the user interface 300.

Moreover, the user interface 300 may additionally or alternatively include a voice bot activity graphical element 330 that provides a snippet of voice bot activity associated with the trained voice bot. The voice bot activity can include information related to each corresponding telephone call conducted by the trained voice bot on behalf of Hypothetical Café. For example, the voice bot activity can include a time and/or date associated with each corresponding telephone call, a duration of each corresponding telephone call, a summary associated with each corresponding telephone call, a transcript associated with each corresponding telephone call, and/or any other information related to each corresponding telephone call conducted by the trained voice bot on behalf of Hypothetical Café. In some implementations, the voice bot activity can be generated during the corresponding telephone calls and/or subsequent to each of the corresponding telephone calls. The voice bot activity enables the third-party developer to monitor performance of the voice bot. The voice bot activity is described below (e.g., with respect to FIG. 3C). In some implementations, the third-party developer may select a "see more" graphical element as shown in FIG. 3A to expand the snippet of voice bot activity (if any exists) to include additional voice activity or launch a voice bot activity interface on the user interface 300.

Even further, the user interface 300 may additionally or alternatively include a voice bot behavioral errors graphical element 330 that provides a snippet of identified voice bot behavioral errors associated with the trained voice bot. The voice bot behavioral errors can include errors made by the trained voice bot during corresponding telephone calls on behalf of Hypothetical Café. These voice bot behavioral errors can include, for example, accepting or suggesting an unavailable time for a restaurant reservation, providing incorrect hours of operation, accepting orders for food that is not available, and/or any other errors that correspond to an incorrect behavior of the trained voice bot. The voice bot behavioral errors enables the voice bot development platform to identify corresponding root causes of these voice bot behavioral errors. In some implementations, the voice bot development platform may undertake one or more actions to automatically correct the corresponding root causes, such as re-labeling one or more of the plurality training instances used to re-train the voice bot, adding one or more feature emphasis inputs to one or more of the plurality training instances used to re-train the voice bot, and/or any other action that may be undertaken by the voice bot training platform to correct the corresponding root causes of the identified voice bot behavioral errors. In additional or alternative implementations, the voice bot development platform may generate one or more notifications to notify the third-party developer of the root causes of the identified voice bot behavioral errors. These notification can optionally include an indication of one or more actions that, when performed by the third-party developer, may correct of the corresponding root causes of the identified voice bot behavioral errors, such as requesting the third-party developer re-label one or more of the plurality training instances used to re-train the voice bot, requesting the third-party developer add one or more feature emphasis inputs to one or more of the plurality training instances used to re-train the voice bot, requesting the third-party developer add one or more additional training instances used to re-train the voice bot (and optionally with one or more particular labels or particular feature emphasis input), and/or any other action that may be undertaken by the third-party developer to correct the corresponding root causes of the identified voice bot behavioral errors. In some implementations, the third-party developer may select a "see more" graphical element as shown in FIG. 3A to expand the snippet of identified voice bot behavioral errors (if any exists) or launch a voice bot behavioral errors interface on the user interface 300.

The third-party developer can navigate the home page or landing page for the voice bot shown in FIG. 3A to create a new voice bot. For example, assume the third-party developer provides the unique identifier of "Hypothetical Café" for the voice bot in the text entry field 318, and selects the "add training instance(s)" graphical element. The third-party developer may be presented with the training instance interface via the user interface 300 as shown in FIG. 3B. The third-party developer may interact with the training instances interface to define training instances for training the voice bot.

In some implementations, the training instances can be obtained from a corpus of training instances. The corpus of training instances can include, for example, one or more previous conversations between a user associated with Hypothetical Café (e.g., an employee) and an additional user (e.g., a customer) during corresponding previous telephone calls, one or more previous conversation between other users not associated with Hypothetical Café during corresponding previous telephone calls (e.g., telephone calls associated with another restaurant entity), and/or other conversations on which the training instances can be generated. For example, in response to receiving user input directed to a training instance corpus interface element 380, the third-party developer can access the corpus of training instances to select a portion of a corresponding conversation to utilize as training instance input 321A (and any prior context of the corresponding conversation) for a given training instance, and a corresponding response to the portion of the corresponding conversation to utilize as training instance output 322A for the given training instance. The user input directed to a training instance corpus interface element 380 can be, for example, touch input detected via a touchscreen or via a user interface input device (e.g., a mouse or stylus) and/or spoken input detected via microphone(s) of the client device (and optionally in response to user input directed to voice interface element 350). In various implementations, the third-party developer can optionally define a feature emphasis input 323A for the given training instance.

In some additional or alternative implementations, the training instances can be obtained from a user input received at the training instances interface presented to the user via the user interface 300. The user input received at the training instances interface can be, for example, touch or typed input detected via a touchscreen or via a user interface input device (e.g., a mouse, a stylus, a keyboard, etc.) and/or spoken input detected via microphone(s) of the client device (and optionally in response to user input directed to voice interface element 350). For example, the user can provide user input including one or more of the training instance input 321A and the training instance output 322A (and optionally the feature emphasis input 323A) in the table of training instances shown in FIG. 3B.

In some additional or alternative implementations, the training instances can be obtained from a demonstrative conversation 352B. The demonstrative conversation 352B may then be utilized to generate a plurality of training instances for training the voice bot associated with Hypothetical Café. For example, as shown by the demonstrative conversation in FIG. 3B, the third-party developer (and optionally another human) can act according to different roles to simulate an actual conversation between a human associated with Hypothetical Café (e.g., an employee) and another human (e.g., a customer) by providing user input for the demonstrative conversation (e.g., typed input or spoken input). For instance, the third-party developer can select an employee graphical element 362A and provide user input 352B1 of "Hello, Hypothetical Café, how may I help you?", select a customer graphical element 362B and provide user input 354B1 of "Hi, I would like to book a table for four people at 6 PM tonight", select the employee graphical element 362A and provide user input 35262 of "Let me check" followed by user input 35263 of "I'm sorry, we only have 7 PM and 8 PM available for four people", select the customer graphical element 362B and provide user input 35462 of "7 PM will work", select the employee graphical element 362A and provide user input 35264 of "What's the name?", select the customer graphical element 362B and provide user input 35463 of "John Smith", and select the employee graphical element 362A and provide user input 35265 of "Thanks John, see you tonight". The voice bot development platform can automatically generate a plurality of training instances based on the demonstrative conversation 352B. However, third-party developer may need to specify any feature emphasis input for the training instances generated based on the demonstrative conversation 352B.

For example, assume training instance input 321A1 generated based on the demonstrative conversation 352B includes an indication that there is an incoming telephone call, and assume training instance output 322A1 includes a corresponding response to the incoming call, such as answering the incoming telephone call and providing output corresponding to the user input 352B1. In this example, features emphasis input 323A1 may correspond to an introduction feature for an incoming telephone call. The introduction for the incoming telephone call may be the user input 352B1, options presented via an interactive voice response (IVR) system, and/or other introductions that the third-party developer may want the voice bot to learn. Notably, there is no prior conversation context for the training instance input 321A1 since there are no preceding portions of the demonstrative conversation 352B. As a result, the voice bot trained on this training instance can learn how to answer incoming telephone calls. In implementations where the training instance input and/or the training instance output is based on user input, the user input may correspond to audio data that captures the user input, a plurality of speech hypotheses generated based on processing the audio data, and/or text corresponding to the user input.

As another example, assume training instance input 321A2 generated based on the demonstrative conversation 352B includes a portion of the demonstrative conversation 352B corresponding to the user input 354B1 and a prior conversation context as indicated by "$Context" (e.g., the user inputs in the demonstrative conversation 352B that occur before the user input 354B1 and/or metadata associated with the demonstrative conversation 352B), and assume training instance output 322A1 includes a corresponding response to the user input 354B1, such as the user input 352B2 and an indication to initiate a remote procedure call (RPC) outbound request for availability. In this example, features emphasis input 323A2 may correspond to features of the user input 354B1, such as a party size feature (e.g., "four people" as indicated by the dashed box for the training instance input 321A2), a time feature (e.g., "6 PM" as also indicated by the dashed box for the training instance input 321A2), and an RPC outbound request feature. Notably, the training instance output 322A2 also includes the indication to initiate the RPC outbound request for availability. This training instance may be considered an RPC training instance, and a type of the RPC training instance may be an RPC outbound request training instance.

The RPC outbound request for availability can include, for example, generating a structured request to inquire about restaurant reservation availability for a particular party size at a requested time (e.g., availability: [party size]=4; [time]=6 PM, or any other form for a structured request), and transmitting the structured request to a third-party system associated with managing restaurant reservations for Hypothetical Café. Although the RPC outbound request is not explicitly included in the demonstrative conversation 352B, the third-party developer can add or inject the RPC outbound request for availability into the training instance output 322A2. Further, although the RPC outbound request is transmitted to the third-party system (and not to the "customer" in the demonstrative conversation 352B), the voice bot can still be trained to generate and transmit the RPC outbound request for availability during the demonstrative conversation 352B based on the training instance input 321A2 requesting availability for restaurant reservations being an RPC outbound request training instance. Moreover, although the RPC outbound request is described as being associated with restaurant reservation availability, it should be understood that is for the sake of example, and is not meant to be limiting. For instance, the RPC outbound request may be associated with food/inventory availability, operating hour inquiries, transferring the telephone call, and/or any other functions that require interacting with one or more third-party systems during telephone calls. As a result, the voice bot trained on this RPC outbound request training instance can learn when and how to initiate RPC outbound requests.

As yet another example, assume training instance input 321A3 generated based on the demonstrative conversation 352B includes a portion of the demonstrative conversation 352B corresponding to an RPC inbound request and a prior conversation context as indicated by "$Context" (e.g., the user inputs in the demonstrative conversation 352B that occur before the RPC inbound request and/or metadata associated with the demonstrative conversation 352B), and assume training instance output 322A3 includes a corresponding response to the RPC inbound request, such as the user input 352B3. In this example, features emphasis input 323A3 may correspond to an RPC inbound request feature. Notably, the training instance output 322A2 also includes the indication to initiate the RPC outbound request for availability. This training instance may be considered an RPC training instance, and a type of the RPC training instance may be RPC inbound request training instance.

The RPC inbound request with availability can include, for example, receiving a structured response that includes an indication of whether there are any restaurant reservations that satisfy parameters of the reservation request (e.g., party size of 4, and time of 6 PM), and optionally alternative one or more alternative times or ranges of time that satisfy the parameters of the reservation request. In some implementations, one or more affinity features can be generated based on a current state of the demonstrative conversation 352B. For instance, assume a requested time for a restaurant reservation is 6 PM as included in the demonstrative conversation 352B, and the requested time is available. In this instance, one or more affinity features that indicate the requested time is available can be generated. In contrast, assume the requested time for the restaurant reservation is not available. In this instance, one or more affinity features that indicate the requested time is not available and also relate the requested time to alternate times (e.g., an hour after the requested time and two hours after the requested time if the availability corresponds to 7 PM and 8 PM instead of the requested time of 6 PM).

Similar to the RPC outbound request described above, although the RPC inbound request is not explicitly included in the demonstrative conversation 352B, the third-party developer can add or inject the RPC inbound request with availability into the training instance input 321A3. Further, although the RPC inbound request is received from the third-party system (and not the "customer" in the demonstrative conversation 352B), the voice bot can still be trained to receive the RPC inbound request with availability during the demonstrative conversation 352B based on the training instance input 321A3 including availability for restaurant reservations being an RPC inbound request training instance. Moreover, although the RPC inbound request is described as being associated with restaurant reservation availability, it should be understood that is for the sake of example, and is not meant to be limiting. For instance, the RPC inbound request may be based on the corresponding RPC outbound request that was transmitted to one or more of the third-party systems. As a result, the voice bot trained on this RPC inbound request training instance can learn how to process RPC inbound requests, and how to respond based on the context of the conversation and data included in the RPC inbound request.

RPC training instances described herein, various technical advantages can be achieved. As one non-limiting example, the voice bot can learn how and/or when to transmit requests to third-party systems and how to utilize responses to those requests in resolving the task(s) of a telephone conversation being conducted by the voice bot. As a result, the task(s) can be resolved by the voice bot during the conversation, and can be resolved efficiently and without the need to engage additional human(s) in the conversation. Further, utilization of RPC training instances enables a quantity of RPC requests to be reduced since there are less errant RPC requests, thereby conserving computational resources that would otherwise be consumed in generating the RPC requests and/or network resources that would otherwise be consumed in transmitting the RPC requests over one or more networks.

As yet another example, assume training instance input 321A4 generated based on the demonstrative conversation 352B includes a portion of the demonstrative conversation 352B corresponding to the user input 354B3 and a prior conversation context as indicated by "$Context" (e.g., the user inputs in the demonstrative conversation 352B that occur before the user input 354B3 and/or metadata associated with the demonstrative conversation 352B), and assume training instance output 322A4 includes a corresponding response to the incoming call, such as a response corresponding to the user input 352B5. In this example, features emphasis input 323A4 may correspond to a name feature (e.g., "John Smith" as indicated by the dashed box for the training instance input 321A4). Notably, in the demonstrative conversation 352B, the "customer" does not provide a name for the restaurant reservation until prompted to do so by the "employee". As a result, the voice bot trained on this training instance can learn what that a value for a name parameter should be solicited in making the restaurant reservation if the "customer" does not provide the value for the name parameter (e.g., John Smith).

In various implementations, and subsequent to defining the training instances, the voice bot associated with Hypothetical Café can be trained. For example, in response to receiving user input directed to a train voice bot graphical element 382, the voice bot can be trained based on the training instances defined by the user input (e.g., as described with respect to the voice bot training engine 160 of FIG. 1). The voice bot associated with Hypothetical Café may correspond to a plurality of layers of a ML model (e.g., an RNN model, a transformer model, a LSTM model, and/or other ML models). Notably, in training the voice bot, one or more of the plurality of layers of the ML model can be attentioned to the corresponding feature emphasis associated with one or more of the plurality of training instances, included in the training instances. For example, the voice bot can be attentioned to at least a party size feature, a time feature, a name feature, an RPC outbound request feature, an RPC inbound request feature, and/or other features defined by corresponding feature emphasis inputs of the training instances discussed in connection with FIG. 3B and additional training instances that are not discussed in connection with FIG. 3B.

Subsequent to deploying the voice bot, the third-party developer can monitor progress of the voice bot. For example, in response to receiving user input directed to a voice bot activity interface element 384, the user interface 300 may present a voice bot activity interface as shown in FIG. 3C. As another example, in response to receiving user input directed to a home interface element 386, the user interface 300 may return to the home page or landing page as shown in FIG. 3A, and the user interface 300 may present a voice bot activity interface as shown in FIG. 3C in response to a selection, from the third-party developer, of the voice bot activity graphical element 330 (or the corresponding "see more" graphical element described above with respect to FIG. 3A). The third-party developer may interact with the voice bot activity interface to view voice bot activity for the voice bot associated with Hypothetical Café. The voice bot activity can be stored in one or more databases accessible by the client device (e.g., the voice activity database 170A2 of FIG. 1).

For example, the user can view conversation summaries 331A for telephone calls conducted by the trained voice bot and on behalf of Hypothetical Café. In some implementations, the third-party developer can view all voice bot activity of the voice bot as shown in FIG. 3C and as indicated by 330A. In some additional or alternative implementations, the third-party developer can toggle between viewing of all the voice bot activity and only voice bot activity that includes identified behavioral errors of the voice bot as indicated by 330B. The text associated with 330A and 330B may be selectable, and enable the third-party developer to toggle between these different views of the voice bot activity. In various implementations, the third-party developer can search the voice bot activity log. For example, the third-party developer may enter one or more terms into the text entry field 330C to search the voice bot activity. Moreover, in various implementations, one or more sorting criteria may be utilized to sort the conversation summaries 331A presented to the user. The one or more sorting criteria can include, for example, recency of the corresponding telephone calls, recency since a corresponding conversation summary was reviewed by the third-party developer, and/or any other sorting criteria.

In some implementations, the conversation summaries provide a natural language explanation of a corresponding telephone call conducted by the voice bot on behalf of Hypothetical Café. For example, conversation summary 331A1 indicates that a "User called to make a reservation, requested time was not available, I suggested an alternate time, the user accepted the suggested alternate time for the reservation, the reservation was completed". In this example, the conversation summary 331A1 indicates the telephone call is similar to the demonstrative conversation 352B of FIG. 3B. The conversation summary 331A1 can additionally or alternatively include an indication that an RPC was performed to check the availability of the requested time and to identify the alternate time and/or other information associated with the corresponding telephone call, such as a time and a date the corresponding telephone call was conducted, a duration of time for the corresponding telephone call, pecuniary information associated with the corresponding telephone call (e.g., a cost of a carryout order), reservation information associated with the corresponding telephone call, and/or any other information derived from the corresponding telephone call.

In some additional or alternative implementations, a transcript associated with the corresponding telephone call conducted by the voice bot on behalf of Hypothetical Café can be accessed from the voice call activity interface (and optionally only if a human conversing with the voice bot consents to the monitoring of the voice bot activity for the corresponding telephone call). For example, conversation summary 331A2 indicates that a "User called to place carryout order, I checked to make sure all the food was available, the carryout order was complete". The conversation summary 331A2 may be generated based on conversation 352C shown in FIG. 3C. For instance, assume the voice bot answers an incoming telephone call directed to Hypothetical Café and that was initiated by a human via a respective client device. Further assume the voice bot, upon answering the incoming telephone call, renders synthesized speech audio data that captures synthesized speech 352C1 of "Hello, Hypothetical Café, how may I help you?" Further assume, the voice bot processes audio data capturing a spoken utterance 354C1 of "Hi, I would like to place an order for carryout" (and the prior context of the conversation 352C), and generates synthesized speech audio data that captures synthesized speech 352C2 of "Okay, what can I get for you?" as a response to the spoken utterance 352C2. The conversation 352C can continue as depicted in FIG. 3C. Notably, the conversation includes an RPC associated third-party inventory system to check availability of particular items included in the carryout order in spoken utterance 354C2 (e.g., the Peas on Earth Soup and the Here Today, Gone Tomato Lasagna). The RPC associated third-party inventory system can include an RPC outbound request, as indicated in the conversation 352 by synthesized speech 352C3 (e.g., "Let me make sure we have the soup"), and can include an RPC inbound request, as indicated in the conversation 352 by synthesized speech 352C4 (e.g., "Okay, we have it"). Further, the voice bot can include an estimated time the carryout order will be ready as also indicated by the synthesized speech (e.g., "40 minutes").

In some additional or alternative implementations, any voice bot behavioral errors identified for a given telephone call can be included in the corresponding conversation summary. For example, conversation summary 331A3 indicates that a "User called to ask whether we have patio seating, the telephone call failed". The conversation summary 331A3 may indicate that the telephone call failed if the voice bot cannot generate a response to a spoken utterance provided by the human, or cannot generate a response to the spoken utterance with sufficient confidence (e.g., as described with respect to the error identification engine 180 of FIG. 1). In implementations where voice bot behavioral errors are identified for the given telephone call, the conversation summary 331A3 can include one or more actions that were automatically performed by the voice bot development platform to correct the identified behavioral error of the voice bot. In additional or alternative implementations where voice bot behavioral errors are identified for the given telephone call, the conversation summary 331A3 can include one or more actions that, when performed by the third-party developer, may correct the identified behavioral error of the voice bot. The one or more actions can include adding one or more additional training instances to re-train the voice bot, or modifying existing training instances that were utilized to train the voice bot associated with Hypothetical Café. For example, in response to receiving user input directed to a training instances interface element 388, the user interface 300 may return to the training instances interface as shown in FIG. 3B. As another example, in response to receiving user input directed to the home interface element 386, the user interface 300 may return to the home page or landing page as shown in FIG. 3A, and the user interface 300 may present the training instances interface as shown in FIG. 3B in response to a selection, from the third-party developer, of the training instances graphical element 320 (or the corresponding "see more" graphical element described above with respect to FIG. 3A). The one or more additional training instances may be added to the training instances for the voice bot associated with Hypothetical Café and/or the existing training instances can be modified. In response to receiving user input directed to the train voice bot graphical element 382, the voice bot can be re-trained based on the additional training instances and/or modified training instances (e.g., as described with respect to the voice bot training engine 160 of FIG. 1).

Although only a single instance of the voice bot associated with the Hypothetical Café is described with respect to FIGS. 3A, 3B, and 3C, it should be understood that is for the sake of example, and is not meant to be limiting. For example, multiple instances of the voice bot may be simultaneously implemented by one or more computing devices (e.g., client device(s), server(s), and/or other computing device(s)), such that the multiple instances of the voice bot can simultaneously be engaged in conversations with corresponding humans (or other voice bots). Each instance of the voice bot can include corresponding processor(s) utilizing a corresponding instance of the plurality of ML layers of the voice bot. Moreover, although the voice bot associated with the Hypothetical Café is described with respect to FIGS. 3A, 3B, and 3C as answering incoming telephone calls, it should be understood that is for the sake of example, and is not meant to be limiting. For example, the voice can additionally or alternatively be trained to initiate outgoing telephone calls to various entities. For instance, training instance input, for a given training example, can include an action or command to initiate a corresponding telephone call with a particular entity to perform a particular task, and training instance output, for the given training instance, can include a corresponding ground truth response associated with initiating an outgoing telephone call. In this manner, the voice bot associated with the Hypothetical Café can be utilized to initiate and conduct outgoing telephone calls to order more inventory from suppliers, inquire about software issues from information technology, verify restaurant reservations with patrons, and/or perform any other function for which the voice bot is trained.

Figure 4:
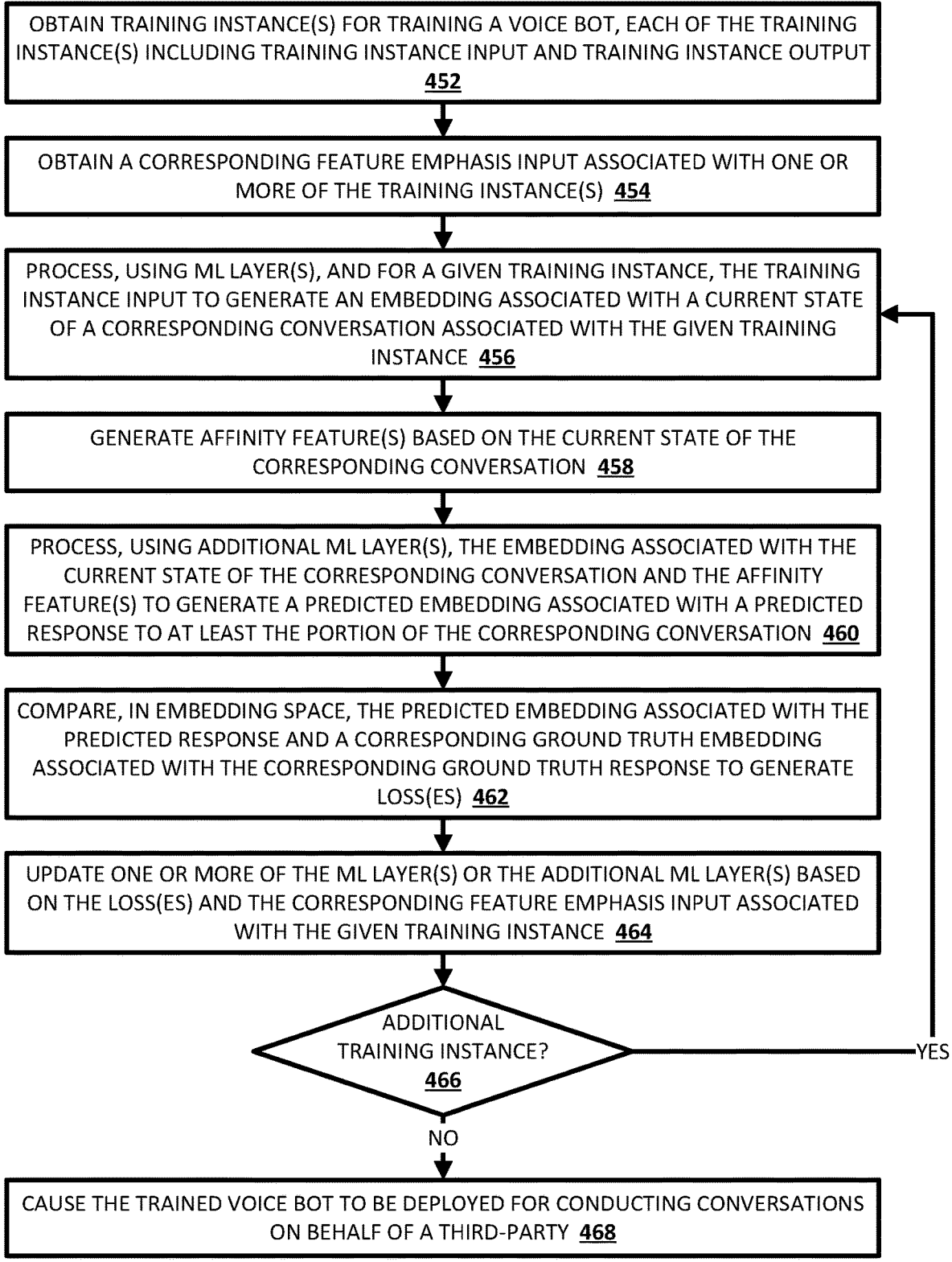
FIG. 4 depicts a flowchart illustrating an example method of training a voice bot based at least in part on feature emphasis input(s), in accordance with various implementations.

Turning now to FIG. 4, a flowchart illustrating an example method 400 of training a voice bot based at least in part on feature emphasis input(s) is depicted. For convenience, the operations of the method 400 are described with reference to a system that performs the operations. This system of the method 400 includes at least one processor, at least one memory, and/or other component(s) of computing device(s) (e.g., client device 110 of FIG. 1, voice bot development system 120 of FIG. 1, and/or computing device 610 of FIG. 6, server(s), and/or other computing devices). Moreover, while operations of the method 400 are shown in a particular order, this is not meant to be limiting. One or more operations may be reordered, omitted, and/or added.

At block 452, the system obtains a plurality of training instances for training a voice bot, each of the plurality of training instances including training instance input and training instance output. In some implementations, the training instance input can include at least a portion of a corresponding conversation and a prior context of the corresponding conversation, and the training instance output can include a corresponding ground truth response to the portion of the conversation. In some additional or alternative implementations, the training instance input can include an indication of an incoming telephone call, and the training instance output can include a corresponding ground truth response associated with answering the incoming telephone call (and optionally an introduction associated with answering the incoming telephone call). In some additional or alternative implementations, the training instance input can include an action or command to initiate performance of an outgoing telephone call with a particular entity to perform a particular task, and the training instance output can include a corresponding ground truth response associated with initiating the outgoing telephone call. In various implementations, the plurality of training instances can be obtained from a corpus of training instances that are generated based on previous telephone calls associated with a third-party for which the voice bot is being trained (or another third-party that is of a same type of entity as the third-party (e.g., restaurant entities, airline entities, retailer entities, etc.)), user input from a third-party developer associated with the third-party, and/or a demonstrative conversation provided by one or more humans (e.g., that may or may not include the third-party developer). Obtaining the plurality of training instances for training the voice bot is described above with respect to FIGS. 3A, 3B, and 3C.

At block 454, the system obtains a corresponding feature emphasis input associated with one or more of the plurality of training instances. The corresponding feature emphasis input can be defined by the third-party developer for one or more of the plurality of training instances. Further, the feature emphasis input causes the voice bot to be attentioned to particular features of the portion of the corresponding conversation for a given training instance. For example, assume the third-party for which the voice bot is being trained is a fictitious airline entity named Hypothetical Airlines, and assume the training instance input, for a given training instance, includes a portion of a corresponding conversation of "I would like to change my flight from SDF to DCA from today at noon to tomorrow at noon". In this example, the feature emphasis inputs can include a flight change feature (e.g., "change my flight), a departure location feature (e.g., "SDF"), a destination location feature (e.g., "DCA"), an original time and date feature (e.g., "today at noon"), and a desired time and date feature (e.g., "tomorrow at noon"). These feature emphasis inputs can be stored in associated with the given training instance in one or more databases (e.g., the training instance(s) database 161A of FIG. 1).

At block 456, the system processes, using a plurality of machine learning (ML) layers of a ML model, and for a given training instance, the training instance input (and optionally the corresponding feature emphasis inputs) to generate an embedding associated with a current state of a corresponding conversation associated with the given training instance. In some implementations, the portion of the corresponding conversation included in the training instance input corresponds to a plurality of speech hypotheses for at least the portion of the corresponding conversation. In some versions of those implementations, the plurality of speech hypotheses can be processed using first ML layers, of the plurality of ML layers, to generate a first embedding, and the prior conversation context can be processed using second ML layers, of the plurality of ML layers, to generate a second embedding. The first embedding and the second embedding may be concatenated to generate the embedding associated with the current state of the corresponding conversation. In some additional or alternative implementations, the portion of the corresponding conversation included in the training instance input corresponds to audio data capturing the portion of the corresponding conversation. In some versions of those implementations, the audio data can be processed, using an automatic speech recognition (ASR) model, to generate a plurality of speech hypotheses for at least the portion of the corresponding conversation. In some versions of those implementations, the plurality of speech hypotheses (and optionally along with the audio data) can be processed using first ML layers, of the plurality of ML layers, to generate a first embedding, and the prior conversation context can be processed using second ML layers, of the plurality of ML layers, to generate a second embedding. The first embedding and the second embedding may be concatenated to generate the embedding associated with the current state of the corresponding conversation.

At block 458, the system generates one or more affinity features based on the current state of the corresponding conversation. The one or more affinity features can represent a relationship between features included in the prior context of the corresponding conversation and/or features associated with the current state of the conversation. For example, assume the third-party for which the voice bot is being trained is a fictitious airline entity named Hypothetical Airlines, and assume the training instance input, for a given training instance, includes a portion of a corresponding conversation of "I would like to change my flight from SDF to DCA from today at noon to tomorrow at noon". In this example, the affinity features can include a temporal affinity feature associated with the 24 hour difference between an original time and date feature (e.g., "today at noon") and a desired time and date feature (e.g., "tomorrow at noon"), an account affinity feature associated with the flight change request for a user associated with a corresponding frequent flier number (assuming the corresponding frequent flier number was previously provided and is included in the prior context of the corresponding conversation), and/or other affinity features.

At block 460, the system processes, using a plurality of additional ML layers of the ML model or an additional ML model, the embedding associated with the current state of the corresponding conversation and one or more of the affinity features to generate a predicted embedding associated with a predicted response to at least the portion of the corresponding conversation. At block 462, the system compares, in embedding space, the predicted embedding associated with the predicted response and a corresponding ground truth embedding associated with the corresponding ground truth response to generate one or more losses. The predicted embedding and the ground truth embedding can correspond to lower dimensional representations of the predicted response and the corresponding ground truth response, respectively. The embedding space allows for comparison of these lower dimensional embeddings. Further, the predicted embedding associated with the predicted response should be close in the embedding space to the corresponding ground truth embedding associated with the corresponding ground truth response. In other words, in processing at least the portion of the corresponding conversation and the prior context of the conversation, the system should predict a response similar to an actual response to at least the portion of the corresponding conversation. For example, a distance metric (e.g., a cosine similarity distance, a Euclidean distance, and/or other distance metrics) between the predicted embedding and the corresponding ground truth embedding, in the embedding space, can be determined, and one or more of the losses can be generated based on the distance metric.

At block 464, the system updates one or more of the plurality of ML layers or the plurality of additional ML layers based on one or more of the losses and the corresponding feature emphasis input associated with the given training instance. For example, the system can backpropagate one or more of the losses across one or more of the plurality of ML layers or the plurality of additional ML layers. Further, by updating the one or more of the plurality of ML layers or the plurality of additional ML layers based on the corresponding feature emphasis inputs associated with the given training instance, one or more of the plurality of ML layers or the plurality of additional ML layers may be attentioned to features included in the given training instance that the third-party developer indicates are important for a the given training instance. As a result, the one or more of the plurality of ML layers or the plurality of additional ML layers are trained to identify these particular features, and what these particular mean in the context of the conversation as a whole.

At block 466, the system determines whether there is an additional training instance for training the voice bot. If, at an iteration of block 466, the system determines there is an additional training instance for the voice bot, the system may return block 456 and repeat the process of blocks 456-464 based on the additional training instance. In some implementations, when additional training instances are available, the system may continue updating one or more of the plurality of ML layers or the plurality of additional ML layers until one or more one or more conditions are satisfied. The one or more conditions can include, for example, validation of one or more of the plurality of ML layers or the plurality of additional ML layers that are updated, convergence of one or more of the plurality of ML layers or the plurality of additional ML layers that are updated (e.g., zero loss or within a threshold range of zero loss), determination that one or more of the plurality of ML layers or the plurality of additional ML layers performs better (e.g., with respect to precision and/or recall) than the an instance of the voice bot currently being utilized (if any), occurrence of training based on at least a threshold quantity of training instances, and/or a duration of training based on the training instances. In some additional or alternative implementations, the system may continue updating one or more of the plurality of ML layers or the plurality of additional ML layers until the voice bot has been trained on each of the plurality of training instances obtained for training the voice bot. If, at an iteration of block 466, the system determines there are no additional training instances for the voice bot or until one or more of the conditions are satisfied, the system may proceed to block 468.

At block 468, the system causes the trained voice bot to be deployed for conducting conversations on behalf of a third-party. For example, the trained voice bot can be deployed to conduct conversations, on behalf of the third-party, for telephone calls associated with the third-party. In some implementations, the trained voice bot can answer incoming telephone calls on behalf of the third-party and engage in a corresponding conversation with a human (or an additional voice bot associated with the human). In additional or alternative implementations, the trained voice bot can initiate performing of outgoing telephone calls on behalf of the third-party and engage in a corresponding conversation with a human or entity (or an additional voice bot associated with the human or an interactive voice response (IVR) system associated with the human). As another example, the trained voice bot can be deployed to conduct conversations, on behalf of the third-party, at a drive thru or in any other service scenario. Notably, multiple instances of the trained voice bot may be simultaneously deployed by the third-party. By deploying multiple instances of the trained voice bot, any combination of multiple incoming telephone calls and multiple outgoing telephone calls can be simultaneously handled.

Figure 5:
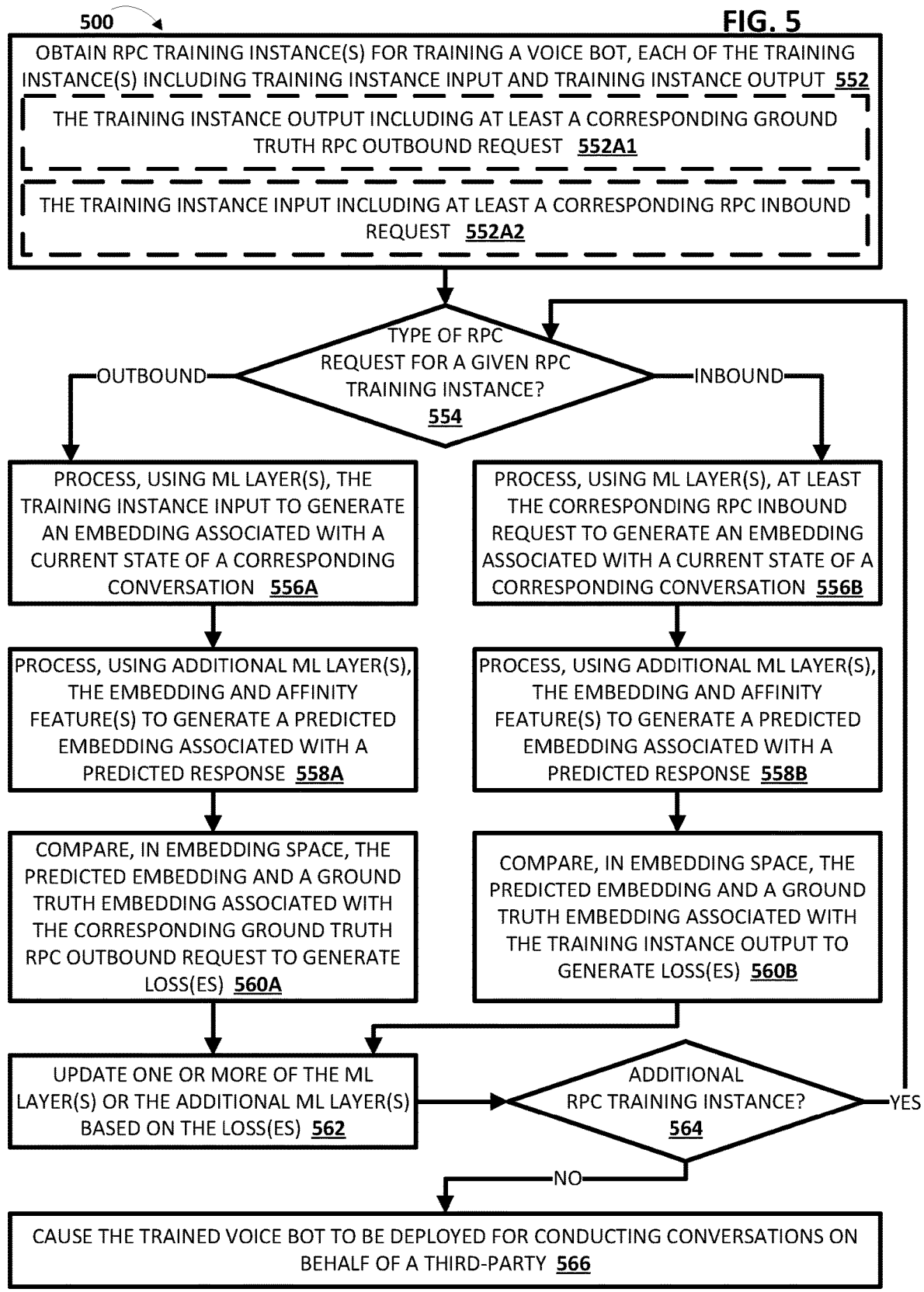
FIG. 5 depicts a flowchart illustrating an example method of training a voice bot based at least in part on remote procedure call(s), in accordance with various implementations.

Turning now to FIG. 5, a flowchart illustrating an example method 500 of training a voice bot based at least in part on remote procedure call(s) (RPC(s)) is depicted. For convenience, the operations of the method 500 are described with reference to a system that performs the operations. This system of the method 500 includes at least one processor, at least one memory, and/or other component(s) of computing device(s) (e.g., client device 110 of FIG. 1, voice bot development system 120 of FIG. 1, and/or computing device 610 of FIG. 6, server(s), and/or other computing devices). Moreover, while operations of the method 500 are shown in a particular order, this is not meant to be limiting. One or more operations may be reordered, omitted, and/or added.

At block 552, the system obtains a plurality of RPC training instances for training a voice bot, each of the plurality of training instances including training instance input and training instance output. The plurality of RPC training instances can be selected from among a superset of training instances associated with the voice bot (e.g., the training instance(s) database 161A of FIG. 1). At block 554, the system determines a type of RPC request for a given RPC training instance, of the plurality of RPC training instances, for training the voice bot.

In some implementations, the type of RPC request for the given RPC training instance may be an RPC outbound request. The system may determine that the type of RPC request is an RPC outbound request based on the training instance output, for the given RPC training instance, including at least a corresponding ground truth RPC outbound request as indicated by sub-block 552A1. If, at an iteration of block 554, the system determines the type of RPC request for the given training instance is an RPC outbound request, the system may proceed to block 556A.

At block 556A, the system processes, using a plurality of machine learning (ML) layers of a ML model, and for a given RPC training instance, the training instance input to generate an embedding associated with a current state of a corresponding conversation. The training instance input can include at least a portion of the corresponding conversation. The training instance input can be processed in the same or similar manner described above with respect to block 456 of FIG. 4.

At block 558A, the system processes, using a plurality of additional ML layers of the ML model or an additional ML model, the embedding and one or more affinity features to generate a predicted embedding associated with a predicted response to at least the portion of the corresponding conversation included in the training instance input. The system can generate one or more of the affinity features in the same or similar manner described above with respect to block 458 of FIG. 4. Further, the system can process the embedding associated with the current state of the corresponding conversation and one or more of the affinity features utilizing the plurality of additional ML layers in the same or similar manner described above with respect to block 460 of FIG. 4.

At block 560A, the system compares, in embedding space, the predicted embedding and a ground truth embedding associated with the corresponding ground truth RPC outbound request to generate one or more losses. The system can compare the predicted embedding and the ground truth embedding to generate one or more of the losses in the same or similar manner described above with respect to block 462 of FIG. 4. Notably, the ground truth embedding is associated with the RPC outbound request (as opposed to a ground truth response to at least the portion of the corresponding conversation described above with respect to FIG. 4). The RPC outbound request, for the given RPC training instance, may be associated with a particular third-party system (e.g., a third-party reservation system, a third-party inventory system, and/or other particular third-party systems). As a result, RPC outbound requests associated with each of these particular third-party systems may be associated with respective portions of the embedding space. For example, assume the corresponding RPC outbound request is associated with a third-party reservation system. In this example, the ground truth embedding can be associated with the third-party reservation system, as opposed to, for example, an embedding associated with a third-party inventory system. The system proceeds to block 562. Block 562 is described below.

In other implementations, the type of RPC request for the given RPC training instance may be an RPC inbound request. The system may determine that the type of RPC request is an RPC inbound request based on the training instance input, for the given RPC training instance, including at least a corresponding RPC inbound request as indicated by sub-block 552A2. If, at an iteration of block 554, the system determines the type of RPC request for the given training instance is an RPC inbound request, the system may proceed to block 556B.

At block 556B, the system processes, using a plurality of ML layers of a ML model, at least the corresponding RPC inbound request to generate an embedding associated with a current state of a corresponding conversation. The training instance input may additionally include at least a portion of a corresponding conversation. The training instance input can be processed in the same or similar manner described above with respect to block 456 of FIG. 4. Notably, the training instance input includes the RPC inbound request (as opposed to simply at least the portion of the corresponding conversation described above with respect to FIG. 4). The RPC inbound request, for the given RPC training instance, may be associated with a particular third-party system (e.g., a third-party reservation system, a third-party inventory system, and/or other particular third-party systems). As a result, the RPC inbound request can be structured information to be conveyed in the conversation, and is received to corresponding RPC outbound requests described above with respect to block 560A.

At block 558B, the system processes, using a plurality of additional ML layers of the ML model or an additional ML model, the embedding and one or more affinity features to generate a predicted embedding associated with a predicted response to at least the RPC inbound request. The system can generate one or more of the affinity features in the same or similar manner described above with respect to block 458 of FIG. 4. Further, the system can process the embedding associated with the current state of the corresponding conversation and one or more of the affinity features utilizing the plurality of additional ML layers in the same or similar manner described above with respect to block 460 of FIG. 4.

At block 560B, the system compares, in embedding space, the predicted embedding and a ground truth embedding associated with the training instance output to generate one or more losses. The training instance output can include a corresponding ground truth response to the RPC inbound request. The system can compare the predicted embedding and the ground truth embedding to generate one or more of the losses in the same or similar manner described above with respect to block 462 of FIG. 4. The system proceeds to block 562.

At block 562, the system updates one or more of the plurality of ML layers or the plurality of additional ML layers based on one or more of the losses generated at block 560A or 560B. The system can update one or more of the plurality of ML layers or the plurality of additional ML layers in the same or similar manner described above with respect to block 464 of FIG. 4.

At block 564, the system determines whether there is an additional RPC training instance for training the voice bot. If, at an iteration of block 564, the system determines there is an additional RPC training instance for the voice bot, the system may return block 554 and repeat the process of blocks 554-562 based on the additional RPC training instance. In some implementations, when additional RPC training instances are available, the system may continue updating one or more of the plurality of ML layers or the plurality of additional ML layers until one or more one or more conditions are satisfied. The one or more conditions can include, for example, validation of one or more of the plurality of ML layers or the plurality of additional ML layers that are updated, convergence of one or more of the plurality of ML layers or the plurality of additional ML layers that are updated (e.g., zero loss or within a threshold range of zero loss), determination that one or more of the plurality of ML layers or the plurality of additional ML layers performs better (e.g., with respect to precision and/or recall) than the an instance of the voice bot currently being utilized (if any), occurrence of training based on at least a threshold quantity of training instances, and/or duration of training based on the training instances. In some additional or alternative implementations, the system may continue updating one or more of the plurality of ML layers or the plurality of additional ML layers until the voice bot has been trained on each of the plurality of RPC training instances obtained for training the voice bot. If, at an iteration of block 564, the system determines there are no additional training instances for the voice bot or until one or more of the conditions are satisfied, the system may proceed to block 556.

At block 566, the system causes the trained voice bot to be deployed for conducting conversations on behalf of a third-party. For example, the trained voice bot can be deployed to conduct conversations, on behalf of the third-party, for telephone calls associated with the third-party. In some implementations, the trained voice bot can answer incoming telephone calls on behalf of the third-party and engage in a corresponding conversation with a human (or an additional voice bot associated with the human). In additional or alternative implementations, the trained voice bot can initiate performing of outgoing telephone calls on behalf of the third-party and engage in a corresponding conversation with a human or entity (or an additional voice bot associated with the human or an interactive voice response (IVR) system associated with the human). As another example, the trained voice bot can be deployed to conduct conversations, on behalf of the third-party, at a drive thru or in any other service scenario. Notably, multiple instances of the trained voice bot may be simultaneously deployed by the third-party. By deploying multiple instances of the trained voice bot, any combination of multiple incoming telephone calls and multiple outgoing telephone calls can be simultaneously handled.

Although FIG. 5 is described herein with respect to only the plurality of RPC training instances, it should be understood that is for the sake of illustration and is not meant to be limiting. For instance, the plurality of RPC training instances can be intermixed with a plurality of additional non-RPC training instances that are utilized to train the voice bot for the third-party, such as those described with to FIG. 4. Further, one or more of the plurality of RPC training instances may also be associated with corresponding feature emphasis input(s) (e.g., as described with respect to FIG. 3B).

Figure 6:
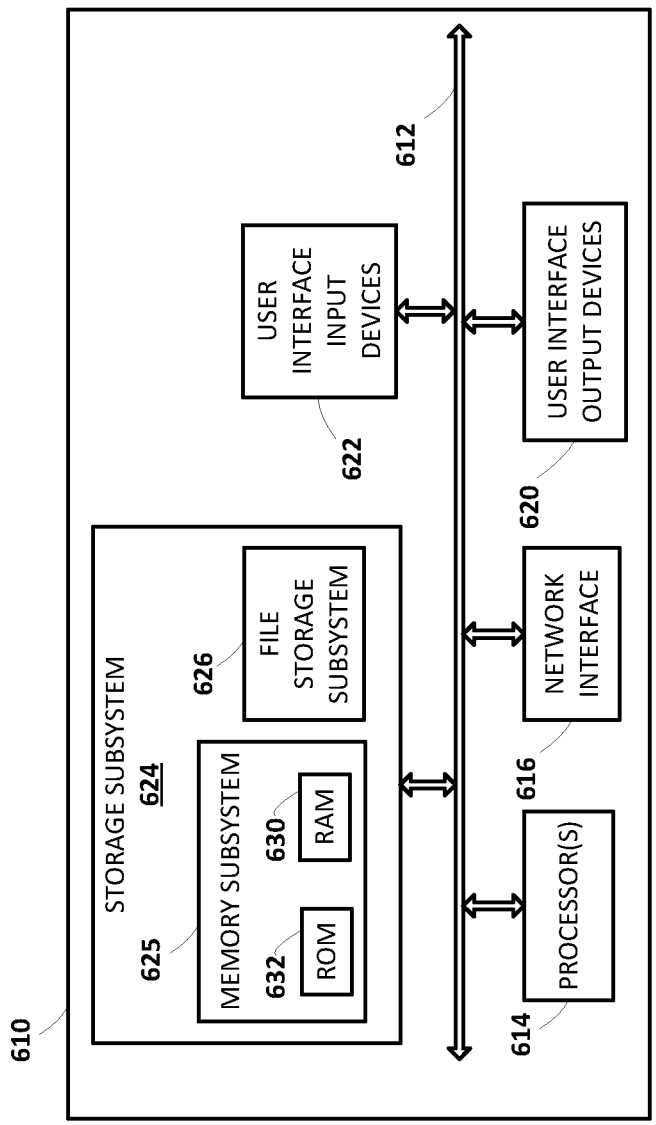
FIG. 6 depicts an example architecture of a computing device, in accordance with various implementations.

FIG. 6 is a block diagram of an example computing device 610 that may optionally be utilized to perform one or more aspects of techniques described herein. In some implementations, one or more of a client device, cloud-based automated assistant component(s), and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the methods disclosed herein, as well as to implement various components depicted in FIG. 1.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem 612 may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes obtaining, via a voice bot development platform, a plurality of training instances. Each of the plurality of training instances include training instance input and training instance output. The training instance input includes at least a portion of a corresponding conversation and a prior context of the corresponding conversation, and the training instance output includes a corresponding ground truth response to at least the portion of the corresponding conversation. The method further includes obtaining, via the voice bot development platform, a corresponding feature emphasis input associated with one or more of the plurality of training instances, and training, via the voice bot development platform, a voice bot based on the plurality of training instances and the corresponding feature emphasis input associated with one or more of the plurality of training instances. The corresponding feature emphasis input associated with one or more of the plurality of training instances attentions the voice bot to a particular feature of the portion of the corresponding conversation. The method further includes, subsequent to training the voice bot, causing the trained voice bot to be deployed for conducting conversations on behalf of a third-party.

These and other implementations of technology disclosed herein can optionally include one or more of the following features.

In some implementations, training the voice bot may include processing, using a plurality of machine learning (ML) layers of a ML model, and for a given training instance of the plurality of training instances, at least the portion of the corresponding conversation and the prior context of the corresponding conversation to generate an embedding associated with a current state of the corresponding conversation.

In some versions of those implementations, the portion of the corresponding conversation may include a plurality of speech hypotheses for at least the portion of the corresponding conversation. Processing at least the portion of the corresponding conversation and the prior context of the corresponding conversation to generate the embedding associated with the current state of the corresponding conversation may include processing, using first ML layers of the plurality of ML layers, the plurality of speech hypotheses to generate a first embedding, processing, using second ML layers of the plurality of ML layers, the prior context of the corresponding conversation to generate a second embedding, and concatenating the first embedding and the second embedding to generate the embedding associated with the current state of the corresponding conversation.

In some further versions of those implementations, the method may further include generating, via the voice bot development platform, a plurality of affinity features based on the embedding associated with the current state of the corresponding conversation. In yet further versions of those implementations, training the voice bot further may further include processing, using a plurality of additional ML layers of the ML model or an additional ML model, the plurality of affinity features and the embedding associated with the current state of the corresponding conversation to generate a predicted embedding associated with a predicted response to at least the portion of the corresponding conversation. In even further versions of those implementations, training the voice bot may further include comparing, in embedding space, the predicted embedding associated with the predicted response to at least the portion of the corresponding conversation and a corresponding ground truth embedding associated with the corresponding ground truth response to at least the portion of the corresponding conversation, generating, based on comparing the predicted embedding and the corresponding ground truth embedding, one or more losses, and updating the ML model based on one or more of the losses and the corresponding feature emphasis input associated with the given training instance. In yet even further versions of those implementations, the ML model may be a transformer model that includes one or more attention mechanisms, and updating the transformer model based on one or more of the losses and the corresponding feature emphasis input associated with the given training instance may include causing weights of one or more of the plurality of ML layers or the plurality of additional ML layers to be updated based on one or more of the losses, and causing the one or more of the attention mechanisms of the transformer model to be attentioned to one or more features of at least the portion of the corresponding conversation based on the corresponding feature emphasis input associated with the given training instance.

In some additional or alternative further versions of those implementations, the portion of the corresponding conversation may include audio data corresponding to a spoken utterance that captures at least the portion of the corresponding conversation. The plurality of speech hypotheses may be generated based on processing, using an automatic speech recognition (ASR) model, the audio data corresponding to the spoken utterance to generate the plurality of speech hypotheses for at least the portion of the corresponding conversation. In yet further versions of those implementations, the method may further include aligning one or more corresponding textual segments associated with each of the plurality of speech hypotheses, and annotating each of the one or more corresponding textual segments with at least one corresponding label to generate a plurality of annotated speech hypotheses. Processing the plurality of speech hypotheses to generate the first embedding using the first ML layers of the plurality of ML layers may include processing the plurality of annotated speech hypotheses to generate the first embedding.

In some additional or alternative further versions of those implementations, the prior context of the corresponding conversation may include at least one or more prior portions of the corresponding conversation. The one or more prior portions of the corresponding conversation occur, in the corresponding conversation, before at least the portion of the corresponding conversation.

In some implementations, obtaining the corresponding feature emphasis input associated with one or more of the plurality of training instances may include receiving natural language input from one or more humans associated with the third-party, and processing the natural language input to obtain the corresponding feature emphasis input associated with one or more of the plurality of training instances. The natural language input may be one or more of: free-form spoken input or free-form typed input.

In some implementations, one or more of the plurality of training instances may be obtained from a corpus of training instances. The corpus of training instances may include a plurality of previous conversations between multiple humans. In some additional or alternative implementations, one or more of the plurality of training instances may be obtained from a corresponding demonstrative conversation between one or more humans. The one or more of the humans may be associated with the third-party. In some additional or alternative implementations, one or more of the plurality of training instances may be obtained from a spoken utterance received via the voice bot development. The spoken utterances may be received from one or more humans associated with the third-party.

In some implementations, causing the trained voice bot to be deployed for conducting the conversations on behalf of the third-party may include causing the trained voice bot to be deployed for conducting the conversations for telephone calls associated with the third-party, and causing the trained voice bot to be deployed for conducting the conversations for the telephone calls associated with the third-party may include causing the voice bot to answer corresponding incoming telephone calls and to conduct the conversations with corresponding humans that initiated the corresponding incoming telephone calls via respective client devices. In some versions of those implementations, the method may further include, subsequent to concluding the incoming telephone call, generating a corresponding conversation summary of the conversations conducted during the corresponding incoming telephone calls, and causing the corresponding conversation summaries of the conversations to be rendered via the voice bot development platform.

In some implementations, causing the trained voice bot to be deployed for conducting the conversations, on behalf of the third-party may include causing the trained voice bot to be deployed for conducting the conversations for telephone calls associated with the third-party, and causing the trained voice bot to be deployed for conducting the conversations for the telephone calls associated with the third-party may include causing the voice bot to initiate corresponding outgoing telephone calls and to conduct the conversations with corresponding humans that answered the corresponding outgoing telephone calls via respective client devices. In some versions of those implementations, the method may further include, subsequent to concluding the outcoming telephone call, generating a corresponding conversation summary of the conversations conducted during the corresponding outgoing telephone call, and causing the corresponding conversation summaries of the conversations to be rendered via the voice bot development platform.

In some implementations, the voice bot development platform is provided by a first party that is distinct from the third-party that deploys the voice bot.

In some implementations, a method implemented by one or more processors is provided, and includes obtaining, via a voice bot development platform, a plurality of remote procedure call (RPC) training instances. Each of the plurality of RPC training instances include training instance input and training instance output. The training instance input includes at least a portion of a corresponding conversation and a prior context of the corresponding conversation, and the training instance output including a corresponding ground truth response to at least the portion of the corresponding conversation. The method further includes training, via the voice bot development platform, a voice bot based on at least the plurality of RPC training instances. Training the voice bot based on the plurality of RPC training instances causes the voice bot to interact with a third-party system. The method further includes, subsequent to training the voice bot, causing the trained voice bot to be deployed for conducting conversations on behalf of a third-party.

These and other implementations of technology disclosed herein can optionally include one or more of the following features.

In some implementations, the corresponding ground truth response for a given RPC training instance, of the plurality of RPC training instances, may include at least a corresponding RPC outbound request. Training the voice bot may include processing, using a plurality of machine learning (ML) layers of a ML model, and for the given training instance, at least the portion of the corresponding conversation and the prior context of the corresponding conversation to generate an embedding associated with a current state of the corresponding conversation.

In some versions of those implementations, the portion of the corresponding conversation may include a plurality of speech hypotheses for at least the portion of the corresponding conversation. Processing at least the portion of the corresponding conversation and the prior context of the corresponding conversation to generate the embedding associated with the current state of the corresponding conversation may include processing, using first ML layers of the plurality of ML layers, the plurality of speech hypotheses to generate a first embedding, processing, using second ML layers of the plurality of ML layers, the prior context of the corresponding conversation to generate a second embedding, and concatenating the first embedding and the second embedding to generate the embedding associated with the current state of the corresponding conversation.

In some further versions of those implementations, the method may further include generating, via the voice bot development platform, a plurality of affinity features based on the embedding associated with the current state of the corresponding conversation.

In yet further versions of those implementations, training the voice bot may further include processing, using a plurality of additional ML layers of the ML model or an additional ML model, the plurality of affinity features and the embedding associated with the current state of the corresponding conversation to generate a predicted embedding associated with a predicted response to at least the portion of the corresponding conversation.

In even further versions of those implementations, training the voice bot may further include comparing, in embedding space, the predicted embedding associated with the predicted response to at least the portion of the corresponding conversation and a corresponding ground truth embedding associated with the corresponding RPC outbound request, generating, based on comparing the predicted embedding and the corresponding ground truth embedding, one or more losses, and updating the ML model based on one or more of the losses.

In some implementations, at least the portion of a corresponding conversation for a given RPC training instance, of the plurality of RPC training instances, may include at least a corresponding RPC inbound request. Training the voice bot may include processing, using a plurality of machine learning (ML) layers of a ML model, and for the given training instance, at least the corresponding RPC inbound request and the prior context of the corresponding conversation to generate an embedding associated with a current state of the corresponding conversation.

In some versions of those implementations, processing at least the portion of the corresponding conversation and the prior context of the corresponding conversation to generate the embedding associated with the current state of the corresponding conversation may include processing, using first ML layers of the plurality of ML layers, at least the RPC inbound request to generate a first embedding, processing, using second ML layers of the plurality of ML layers, the prior context of the corresponding conversation to generate a second embedding, and concatenating the first embedding and the second embedding to generate a predicted embedding associated with a predicted response to at least the portion of the corresponding conversation.

In some further versions of those implementations, training the voice bot may include comparing, in embedding space, the predicted embedding associated with the predicted response to at least the portion of the corresponding conversation and a corresponding ground truth embedding associated with the corresponding ground truth response, generating, based on comparing the predicted embedding and the corresponding ground truth embedding, one or more losses, and updating the ML model based on one or more of the losses.

In some implementations, the third-party that deploys the voice bot is distinct from an additional third-party associated with the third-party system.

In some implementations, causing the trained voice bot to be deployed for conducting the conversations on behalf of the third-party may include causing the trained voice bot to be deployed for conducting the conversations for telephone calls associated with the third-party, and causing the trained voice bot to be deployed for conducting the conversations for the telephone calls associated with the third-party may include causing the voice bot to answer corresponding incoming telephone calls and to conduct the conversations with corresponding humans that initiated the corresponding incoming telephone calls via respective client devices. The voice bot, during the conversations with the corresponding humans, may interact with the third-party system via a corresponding RPC. In some versions of those implementations, the method may further include, subsequent to concluding the incoming telephone call, generating a corresponding conversation summary of the conversations conducted during the corresponding incoming telephone calls, and causing the corresponding conversation summaries of the conversations to be rendered via the voice bot development platform. One or more of the corresponding conversation summaries may include an indication that the corresponding RPC occurred based on corresponding spoken utterances of the corresponding humans received during the corresponding incoming telephone calls.

In some implementations, a voice bot development platform is provided, and includes at least one processor, at least one memory, at least one database including a plurality of training instances, and at least one user interface to enable a third-party developer associated with a third-party to interact with the voice bot development platform to: obtain a plurality of training instances, train a voice bot based on the plurality of training instances to generate a plurality of corresponding behaviors for the voice bot, and subsequent to training the voice bot, enable the third-party developer to add additional training instances stored in the at least one database to add a new behavior, the plurality of corresponding behaviors, for the voice bot, and enable the third-party developer to modify existing training instances stored in the at least one database to modify an existing behavior, of the plurality of corresponding behaviors, of the voice bot. Each of the plurality of training instances include training instance input and training instance output. The training instance input includes at least a portion of a corresponding conversation and a prior context of the corresponding conversation, and the training instance output includes a corresponding ground truth response to at least the portion of the corresponding conversation.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   obtaining, via a voice bot development platform that is associated with a first-party, a plurality of training instances from a third-party developer associated with a third-party, the first-party being a first-party entity and the third-party being a distinct third-party entity that is distinct from the first-party entity, and each of the plurality of training instances including:
      training instance input, the training instance input including at least a portion of a corresponding conversation and a prior context of the corresponding conversation, and
      training instance output, the training instance output including a corresponding ground truth response to at least the portion of the corresponding conversation;
   obtaining, via the voice bot development platform, a corresponding feature emphasis input associated with one or more of the plurality of training instances, wherein the corresponding feature emphasis input is directed to a corresponding particular feature of the portion of the corresponding conversation for the one or more of the plurality of training instances, wherein the corresponding feature emphasis input is in addition to the prior context of the corresponding conversation, and wherein obtaining the corresponding feature emphasis input associated with one or more of the plurality of training instances comprises:
      receiving, via the voice bot development platform, natural language input from the third-party developer that defines the corresponding feature emphasis input associated with one or more of the plurality of training instances; and
      processing, via the voice bot development platform, the natural language input to obtain the corresponding feature emphasis input that is associated with one or more of the plurality of training instances and that is defined by the natural language input received from the third-party developer;
   training, via the voice bot development platform, a voice bot based on at least the plurality of training instances and the corresponding feature emphasis input associated with the one or more of the plurality of training instances, wherein training the voice bot based on at least the plurality of training instances and the corresponding feature emphasis input associated with the one or more of the plurality of training instances comprises utilizing one or more attention mechanisms to attention the voice bot to the corresponding particular feature of the portion of the corresponding conversation; and
   subsequent to training the voice bot:
      causing the trained voice bot to be deployed for conducting conversations on behalf of the third-party.

2. The method of claim 1, wherein training the voice bot comprises:
   processing, using a plurality of machine learning (ML) layers of a ML model, and for a given training instance of the plurality of training instances, at least the portion of the corresponding conversation and the prior context of the corresponding conversation to generate an embedding associated with a current state of the corresponding conversation.

3. The method of claim 2, wherein the portion of the corresponding conversation comprises a plurality of speech hypotheses for at least the portion of the corresponding conversation, and wherein processing at least the portion of the corresponding conversation and the prior context of the corresponding conversation to generate the embedding associated with the current state of the corresponding conversation comprises:
   processing, using first ML layers of the plurality of ML layers, the plurality of speech hypotheses to generate a first embedding,
   processing, using second ML layers of the plurality of ML layers, the prior context of the corresponding conversation to generate a second embedding, and concatenating the first embedding and the second embedding to generate the embedding associated with the current state of the corresponding conversation.

4. The method of claim 3, further comprising:
generating, via the voice bot development platform, a plurality of affinity features based on the embedding associated with the current state of the corresponding conversation.

5. The method of claim 4, wherein training the voice bot further comprises:
processing, using a plurality of additional ML layers of the ML model or an additional ML model, the plurality of affinity features and the embedding associated with the current state of the corresponding conversation to generate a predicted embedding associated with a predicted response to at least the portion of the corresponding conversation.

6. The method of claim 5, wherein training the voice bot further comprises:
comparing, in embedding space, the predicted embedding associated with the predicted response to at least the portion of the corresponding conversation and a corresponding ground truth embedding associated with the corresponding ground truth response to at least the portion of the corresponding conversation;
generating, based on comparing the predicted embedding and the corresponding ground truth embedding, one or more losses; and
updating the ML model based on one or more of the losses and the corresponding feature emphasis input associated with the given training instance.

7. The method of claim 6, wherein the ML model is a transformer model that includes the one or more attention mechanisms, and wherein updating the transformer model based on one or more of the losses and the corresponding feature emphasis input associated with the given training instance comprises:
causing weights of one or more of the plurality of ML layers or the plurality of additional ML layers to be updated based on one or more of the losses; and
causing the one or more attention mechanisms of the transformer model to be attentioned to one or more features of at least the portion of the corresponding conversation based on the corresponding feature emphasis input associated with the given training instance.

8. The method of claim 3, wherein the portion of the corresponding conversation further comprises audio data corresponding to a spoken utterance that captures at least the portion of the corresponding conversation, and wherein the plurality of speech hypotheses are generated based on processing, using an automatic speech recognition (ASR) model, the audio data corresponding to the spoken utterance to generate the plurality of speech hypotheses for at least the portion of the corresponding conversation.

9. The method of claim 8, further comprising:
aligning one or more corresponding textual segments associated with each of the plurality of speech hypotheses;
annotating each of the one or more corresponding textual segments with at least one corresponding label to generate a plurality of annotated speech hypotheses; and
wherein processing the plurality of speech hypotheses to generate the first embedding using the first ML layers of the plurality of ML layers comprises:
processing the plurality of annotated speech hypotheses to generate the first embedding.

10. The method of claim 3, wherein the prior context of the corresponding conversation includes at least one or more prior portions of the corresponding conversation, and wherein the one or more prior portions of the corresponding conversation occur, in the corresponding conversation, before at least the portion of the corresponding conversation.

11. The method of claim 1, wherein the natural language input is one or more of: free-form spoken input or free-form typed input.

12. The method of claim 1, wherein one or more of the plurality of training instances are further obtained from a corpus of training instances, and wherein the corpus of training instances including a plurality of previous conversations between multiple humans.

13. The method of claim 1, wherein one or more of the plurality of training instances are further obtained from a corresponding demonstrative conversation between one or more humans, and wherein one or more of the humans are associated with the third-party.

14. The method of claim 1, wherein one or more of the plurality of training instances are further obtained from a spoken utterance received via the voice bot development, and wherein the spoken utterances are received from one or more humans associated with the third-party.

15. The method of claim 1, wherein causing the trained voice bot to be deployed for conducting the conversations on behalf of the third-party comprises causing the trained voice bot to be deployed for conducting the conversations for telephone calls associated with the third-party, and wherein causing the trained voice bot to be deployed for conducting the conversations for the telephone calls associated with the third-party comprises:
causing the voice bot to answer corresponding incoming telephone calls and to conduct the conversations with corresponding humans that initiated the corresponding incoming telephone calls via respective client devices.

16. The method of claim 15, further comprising:
subsequent to concluding the incoming telephone call:
generating a corresponding conversation summary for the conversations conducted during the corresponding incoming telephone calls; and
causing the corresponding conversation summaries of the conversations to be rendered via the voice bot development platform.

17. The method of claim 1, wherein causing the trained voice bot to be deployed for conducting the conversations, on behalf of the third-party comprises causing the trained voice bot to be deployed for conducting the conversations for telephone calls associated with the third-party, and wherein causing the trained voice bot to be deployed for conducting the conversations for the telephone calls associated with the third-party comprises:
causing the voice bot to initiate corresponding outgoing telephone calls and to conduct the conversations with corresponding humans that answered the corresponding outgoing telephone calls via respective client devices.

18. The method of claim 17, further comprising:
subsequent to concluding the outcoming telephone call:
generating a corresponding conversation summary of the conversations conducted during the corresponding outgoing telephone call; and
causing the corresponding conversation summaries of the conversations to be rendered via the voice bot development platform.

19. A voice bot development platform that is associated with a first-party, the voice bot development platform comprising:
at least one processor;
memory storing instructions that, when executed by the at least one processor, cause the voice bot development platform to:
obtain, via the voice bot development platform, a plurality of training instances from a third-party developer associated with a third-party, the first-party being a first-party entity and the third-party being a distinct third-party entity that is distinct from the first-party entity, and each of the plurality of training instances including:
training instance input, the training instance input including at least a portion of a corresponding conversation and a prior context of the corresponding conversation, and
training instance output, the training instance output including a corresponding ground truth response to at least the portion of the corresponding conversation;
obtain, via the voice bot development platform, a corresponding feature emphasis input associated with one or more of the plurality of training instances, wherein the corresponding feature emphasis input is directed to a corresponding particular feature of the portion of the corresponding conversation for the one or more of the plurality of training instances, wherein the corresponding feature emphasis input is in addition to the prior context of the corresponding conversation, and wherein the instructions to obtain the corresponding feature emphasis input associated with one or more of the plurality of training instances comprise instruction to:
receive, via the voice bot development platform, natural language input from the third-party developer that defines the corresponding feature emphasis input associated with one or more of the plurality of training instances; and
process, via the voice bot development platform, the natural language input to obtain the corresponding feature emphasis input that is associated with one or more of the plurality of training instances and that is defined by the natural language input received from the third-party developer;
train, via the voice bot development platform, a voice bot based on at least the plurality of training instances and the corresponding feature emphasis input associated with the one or more of the plurality of training instances, wherein the corresponding feature emphasis input associated with the one or more of the plurality of training instances attentions the voice bot to the corresponding particular feature of the portion of the corresponding conversation; and
train, via the voice bot development platform, a voice bot based on at least the plurality of training instances and the corresponding feature emphasis input associated with the one or more of the plurality of training instances, wherein train, via the voice bot development platform, a voice bot based on at least the plurality of training instances and the corresponding feature emphasis input associated with the one or more of the plurality of training instances, wherein training the voice bot based on at least the plurality of training instances and the corresponding feature emphasis input associated with the one or more of the plurality of training instances comprise instructions to utilize one or more attention mechanisms to attention the voice bot to the corresponding particular feature of the portion of the corresponding conversation; and
subsequent to training the voice bot:
cause the trained voice bot to be deployed for conducting conversations on behalf of the third-party.

20. A non-transitory computer-readable storage medium storing instructions that, when executed by at least one processor of a voice bot development platform, cause the at least one processor of the voice bot development platform to:
obtain, via the voice bot development platform that is associated with a first-party, a plurality of training instances from a third-party developer associated with a third-party, the first-party being a first-party entity and the third-party being a distinct third-party entity that is distinct from the first-party entity, and each of the plurality of training instances including:
training instance input, the training instance input including at least a portion of a corresponding conversation and a prior context of the corresponding conversation, and
training instance output, the training instance output including a corresponding ground truth response to at least the portion of the corresponding conversation;
obtain, via the voice bot development platform, a corresponding feature emphasis input associated with one or more of the plurality of training instances, wherein the corresponding feature emphasis input is directed to a corresponding particular feature of the portion of the corresponding conversation for the one or more of the plurality of training instances, wherein the corresponding feature emphasis input is in addition to the prior context of the corresponding conversation, and wherein the instructions to obtain the corresponding feature emphasis input associated with one or more of the plurality of training instances comprise instruction to:
receive, via the voice bot development platform, natural language input from the third-party developer that defines the corresponding feature emphasis input associated with one or more of the plurality of training instances; and
process, via the voice bot development platform, the natural language input to obtain the corresponding feature emphasis input that is associated with one or more of the plurality of training instances and that is defined by the natural language input received from the third-party developer;
train, via the voice bot development platform, a voice bot based on at least the plurality of training instances and the corresponding feature emphasis input associated with the one or more of the plurality of training instances, wherein training the voice bot based on at least the plurality of training instances and the corresponding feature emphasis input associated with the one or more of the plurality of training instances comprise instructions to utilize one or more attention mechanisms to attention the voice bot to the corresponding particular feature of the portion of the corresponding conversation; and subsequent to training the voice bot:
  cause the trained voice bot to be deployed for conducting conversations on behalf of the third-party.

* * * * *